US012810452B2

(12) United States Patent
Zhou et al.

(10) Patent No.: US 12,810,452 B2
(45) Date of Patent: Nov. 24, 2026

(54) LiDAR SIMULTANEOUS LOCALIZATION AND MAPPING

(71) Applicant: Magic Leap, Inc., Plantation, FL (US)

(72) Inventors: Lipu Zhou, Sunnyvale, CA (US); Ashwin Swaminathan, Dublin, CA (US); Lomesh Agarwal, Fremont, CA (US)

(73) Assignee: Magic Leap, Inc., Plantation, FL (US)

( * ) Notice: Subject to any disclaimer, the term of this patent is extended or adjusted under 35 U.S.C. 154(b) by 517 days.

(21) Appl. No.: 18/264,572

(22) PCT Filed: Feb. 11, 2022

(86) PCT No.: PCT/US2022/070642

§ 371 (c)(1),
(2) Date: Aug. 7, 2023

(87) PCT Pub. No.: WO2022/174263

PCT Pub. Date: Aug. 18, 2022

(65) Prior Publication Data

US 2024/0062403 A1 Feb. 22, 2024

Related U.S. Application Data

(60) Provisional application No. 63/149,037, filed on Feb. 12, 2021.

(51) Int. Cl.
*G06T 7/579* (2017.01)
*G06T 19/00* (2011.01)

(52) U.S. Cl.
CPC ............ *G06T 7/579* (2017.01); *G06T 19/006* (2013.01); *G06T 2207/10028* (2013.01)

(58) Field of Classification Search
CPC ................... G06T 7/579; G06T 19/006; G06T 2207/10028
See application file for complete search history.

(56) References Cited

U.S. PATENT DOCUMENTS

| | | | |
|---|---|---|---|
| 4,852,988 | A | 8/1989 | Velez |
| 6,433,760 | B1 | 8/2002 | Vaissie |

(Continued)

FOREIGN PATENT DOCUMENTS

| | | | |
|---|---|---|---|
| CA | 2316473 | A1 | 1/2001 |
| CA | 2362895 | A1 | 12/2002 |
| CA | 2388766 | A1 | 12/2003 |

OTHER PUBLICATIONS

International Preliminary Report on Patentability and Written Opinion mailed Aug. 24, 2023, for PCT Application No. PCT/US2022/070642, seven pages.

(Continued)

*Primary Examiner* — Catherine T. Rastovski
*Assistant Examiner* — Nyla Gavia
(74) *Attorney, Agent, or Firm* — Zi Y. Wong; Via LLP

(57) ABSTRACT

Disclosed here in are systems and methods for mapping environment information. In some embodiments, the systems and methods are configured for mapping information in a mixed reality environment. In some embodiments, the system is configured to perform a method including scanning an environment including capturing, with a sensor, a plurality of points of the environment; tracking a plane of the environment; updating observations associated with the environment by inserting a keyframe into the observations; determining whether the plane is coplanar with a second plane of the environment; in accordance with a determination that the plane is coplanar with the second plane, performing planar bundle adjustment on the observations associated with the environment; and in accordance with a determination that the plane is not coplanar with the second plane, performing planar bundle adjustment on a portion of the observations associated with the environment.

17 Claims, 13 Drawing Sheets

(56) References Cited

U.S. PATENT DOCUMENTS

| | | | | |
|---|---|---|---|---|
| 6,491,391 | B1 | 12/2002 | Blum et al. | |
| 6,847,336 | B1 | 1/2005 | Lemelson | |
| 6,943,754 | B2 | 9/2005 | Aughey | |
| 6,977,776 | B2 | 12/2005 | Volkenandt et al. | |
| 7,347,551 | B2 | 3/2008 | Fergason et al. | |
| 7,488,294 | B2 | 2/2009 | Torch | |
| 8,235,529 | B1 | 8/2012 | Raffle | |
| 8,611,015 | B2 | 12/2013 | Wheeler | |
| 8,638,498 | B2 | 1/2014 | Bohn et al. | |
| 8,696,113 | B2 | 4/2014 | Lewis | |
| 8,929,589 | B2 | 1/2015 | Publicover et al. | |
| 9,010,929 | B2 | 4/2015 | Lewis | |
| 9,274,338 | B2 | 3/2016 | Robbins et al. | |
| 9,292,973 | B2 | 3/2016 | Bar-Zeev et al. | |
| 9,720,505 | B2 | 8/2017 | Gribetz et al. | |
| 10,013,053 | B2 | 7/2018 | Cederlund et al. | |
| 10,025,379 | B2 | 7/2018 | Drake et al. | |
| 10,410,429 | B2 * | 9/2019 | Chen | G06T 15/205 |
| 2003/0030597 | A1 | 2/2003 | Geist | |
| 2006/0023158 | A1 | 2/2006 | Howell et al. | |
| 2008/0310757 | A1 * | 12/2008 | Wolberg | G06V 20/653 382/285 |
| 2011/0211056 | A1 | 9/2011 | Publicover et al. | |
| 2011/0213664 | A1 | 9/2011 | Osterhout | |
| 2012/0021806 | A1 | 1/2012 | Maltz | |
| 2012/0202538 | A1 | 8/2012 | Uusitalo et al. | |
| 2012/0263448 | A1 | 10/2012 | Winter | |
| 2014/0195918 | A1 | 7/2014 | Friedlander | |
| 2015/0168731 | A1 | 6/2015 | Robbins | |
| 2016/0100034 | A1 | 4/2016 | Miller | |
| 2016/0259404 | A1 | 9/2016 | Woods | |
| 2017/0206691 | A1 * | 7/2017 | Harrises | G02B 27/0172 |
| 2018/0075643 | A1 | 3/2018 | Sequeira et al. | |
| 2019/0243448 | A1 * | 8/2019 | Miller | H04N 13/383 |
| 2020/0043236 | A1 * | 2/2020 | Miller | H04N 13/383 |

OTHER PUBLICATIONS

European Search Report dated Jul. 15, 2024, for EP Application No. 22753567.1, nine pages.

Wang, Jun et al.: (Jun. 18, 2017). "High Quality 3D Reconstruction of Indoor Environments using RGB-D Sensors", 2017, 12th IEEE Conference on industrial electronics and Applications (ICIEA), IEEE, pp. 1739-1744, [retrieved on Feb. 5, 2018].

Zhou, Lipu et al. (Jun. 24, 2021). "LiDAR SLAM With Plane Adjustment for Indoor Environment", IEEE Robotics and Automation Letters, vol. 6, No. 4, Oct. 2021, pp. 7073-7080, [retrieved on Jul. 29, 2021].

Deschaud, J.-E. (2018). "IMLS-SLAM: Scan-to-model matching based on 3d data," IN 2018 IEEE International Conference on Robotics and Automation, (ICRA). IEEE, 2018, pp. 2480-2485, located at: https://arxiv.org/pdf/1802.08633.pdf.

Dub'e, R. et al. (2020). "SegMap: Segment-based mapping and localization using data-driven descriptors," The International Journal of Robotics Research, vol. 39, No. 2-3, pp. 339-355, 2020, located at: https://arxiv.org/pdf/1909.12837.pdf.

Fischler, M. A. et al. (1981). "Random Sample Consensus: A Paradigm for Model Fitting with Applications to Image Analysis and Automated Cartography," Communications of the ACM, vol. 24, No. 6, pp. 381-395, 1981, located at: https://dl.acm.org/doi/pdf/10.1145/358669.358692.

Forster, C., et al. (2016). "On-Manifold Preintegration for Real-Time Visual-Inertial Odometry," IEEE Transactions, on Robotics, vol. 33, No. 1, pp. 1-21, 2016, located at: https://arxiv.org/pdf/1512.02363.pdf.

Geneva, P., et al. (2018). "Lips: LiDAR-Inertial 3D Plane Slam," in 2018 IEEE/RSJ International Conference on Intelligent Robots and Systems (IROS). IEEE, 2018, pp. 123-130, located at: file:///C:/Users/FXV2/Downloads/rpng_tr_2018_lips.pdf.

Hartley, R. et al. (2003). "Multiple View Geometry in Computer Vision", Second Edition, Cambridge University Press, 2003, Published online by Cambridge University, first published 2000, second edition 2003, located at: https://cseweb.ucsd.edu/classes/sp13/cse252B-a/HZ2eCh2.pdf (this is a book).

Ho, K. L. et al. (2006). "Loop closure detection in SLAM by combining visual and spatial appearance", Robotics and Autonomous Systems, vol. 54, No. 9, pp. 740-749, 2006, located at: https://eng.ox.ac.uk/media/5753/visualloopclosureslam.pdf.

Hsiao, M. et al. (2017). "Keyframe-based Dense Planar SLAM," in 2017 IEEE International Conference on Robotics and Automation (ICRA). IEEE, 2017, pp. 5110-5117, located at: https://www.ri.cmu.edu/app/uploads/2017/05/Hsiao17icra.pdf.

Jacob, R. "Eye Tracking in Advanced Interface Design", Virtual Environments and Advanced Interface Design, Oxford University Press, Inc. (Jun. 1995).

Kaess, M. (2015). "Simultaneous Localization and Mapping with Infinite Planes," in 2015 IEEE International Conference on Robotics and Automation (ICRA). IEEE, 2015, pp. 4605-4611, located at: https://www.cs.cmu.edu/~kaess/pub/Kaess15icra.pdf.

Klein, G. et al. (2007), "Parallel tracking and mapping for small AR workspaces," in 2007 6th IEEE and ACM international symposium on mixed and augmented reality. IEEE, 2007, pp. 225-234, located at: https://www.robots.ox.ac.uk/~gk/publications/KleinMurray2007ISMAR.pdf.

Lin, J. et al. (2019). "A fast, complete, point cloud based loop closure for LiDAR odometry and mapping," arXiv preprint arXiv:1909.11811, 2019, located at: https://arxiv.org/pdf/1909.11811.pdf.

Lin, J. et al. (2020). "Loam livox: A fast, robust, high-precision LiDAR odometry and mapping package for LiDARs of small FoV," in 2020 IEEE, International Conference on Robotics and Automation (ICRA), located at: https://arxiv.org/pdf/1909.06700.pdf.

More, J. J. (1977). "The levenberg-marquardt algorithm: implementation and theory," in Numerical analysis. Springer, 1978, pp. 105-116, located at: https://digital.library.unt.edu/ark:/67531/metadc1448594/m2/1/high_res_d/7256021.pdf.

Mur-Artal, R. et al. (2015). "ORB-SLAM: A versatile and accurate monocular slam system", IEEE transactions on robotics, vol. 31, No. 5, pp. 1147-1163, 2015, located at: https://ieeexplore.ieee.org/stamp/stamp.jsp?tp=&arnumber=7219438.

Pathak, K., et al. (Jul. 2010). "Fast Registration Based on Noisy Planes With Unknown Correspondences for 3D Mapping," IEEE Transactions on Robotics, vol. 26, No. 3, pp. 424-441, 2010, located at: file:///C:/Users/FXV2/Downloads/PlaneRegistration-ITRO10-Preprint.pdf.

Pomerleau, F., et al. (Jul. 21, 2015). "A Review of Point Cloud Registration Algorithms for Mobile Robotics", HAL Open Science, Foundations and Trends in Robotics 2015, located at: https://hal.science/hal-01178661/document.

Poppinga, J. et al. (2008). "Fast plane Detection and Polygonalization in noisy 3D Range Images," in 2008, IEEE/RSJ International Conference on Intelligent Robots and Systems, IEEE, 2008, pp. 3378-3383, located at: https://ieeexplore.ieee.org/document/4650729.

Qi, C. R. et al. (2017). "PointNet: Deep Learning on Point Sets for 3D Classification and Segmentation", in Proceedings of the IEEE conference on computer vision and pattern recognition, 2017, pp. 652-660, Submitted on Dec. 2, 2016 (v1), last revised Apr. 10, 2017 (this version, v2), located at: https://openaccess.thecvf.com/content_cvpr_2017/papers/Qi_PointNet_Deep_Learning_CVPR_2017_paper.pdf.

Rolland, J. et al., "High-resolution inset head-mounted display", Optical Society of America, vol. 37, No. 19, Applied Optics, (Jul. 1, 1998).

Rother, C. (2002). "A new approach to vanishing point detection in architectural environments." Image and Vision Computing, vol. 20, Issues 9-10, Aug. 2002, 647-655. Jan. 14, 2002 (Jan. 14, 2002) Retrieved on Mar. 17, 2022 from https://www.sciencedirect.com/science/article/abs/pii/S0262885602000549 , entire document.

Rozenberszki, D. et al. (2020). "LOL: Lidar-only Odometry and Localization in 3D point cloud maps," in 2020 IEEE International Conference on Robotics and Automation (ICRA). IEEE, 2020, located at: https://arxiv.org/pdf/2007.01595. pdf.

(56) References Cited

OTHER PUBLICATIONS

Segal, A. et al.(2009). "Generalized-ICP." in Robotics: science and systems, vol. 2, No. 4. Seattle, WA, 2009, p. 435, located at: https://www.roboticsproceedings.org/rss05/p21.pdf.
Shan, T. et al. (2018). "Lego-LOAM: Lightweight and ground-optimized lidar odometry and mapping on variable terrain," IEEE/RSJ International Conference on Intelligent Robots and Systems, (IROS). IEEE, 2018, pp. 4758-4765, located at: file:///C:/Users/FXV2/Downloads/Shan_Englot_IROS_2018_Preprint.pdf.
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Wang, H. et al. (2020). "Intensity Scan Context: Coding Intensity and Geometry Relations for Loop Closure Detection," in 2020 IEEE International Conference on Robotics and Automation (ICRA), located at: https://arxiv.org/pdf/2003.05656.pdf.
Yoshida, A. et al., "Design and Applications of a High Resolution Insert Head Mounted Display", (Jun. 1994).
Zhang, J. et al. (2014). "LOAM: Lidar odometry and mapping in real-time." in Robotics: Science and Systems, vol. 2, No. 9, located at: https://www.ri.cmu.edu/pub_files/2014/7/Ji_LidarMapping_RSS2014_v8.pdf.
Zhou, L. et al. (Nov. 2020). "An Efficient Planar Bundle Adjustment Algorithm", Proc. IEEE Intl. Symp. on Mixed and Augmented Reality, ISMAR, Porto de Galinhas, Brazil, located at: https://www.cs.cmu.edu/~kaess/pub/Zhou20ismar.pdf.

* cited by examiner

LiDAR SIMULTANEOUS LOCALIZATION AND MAPPING

CROSS-REFERENCE TO RELATED APPLICATIONS

This application is a national stage application under 35 U.S.C. § 371 of International Application No. PCT/US2022/070642, filed internationally on Feb. 11, 2022, which claims priority to U.S. Provisional Application No. 63/149,037, filed on Feb. 12, 2021 the contents of which are both incorporated by reference herein in their entirety.

FIELD

This disclosure relates in general to systems and methods for mapping an environment. In some examples, a light detection and ranging (LiDAR) sensor is used to map an environment using simultaneous localization and mapping (SLAM).

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, and could simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

Presenting a virtual environment that overlaps or overlays the real environment can be difficult. For example, mixing a virtual environment with a real environment can require a complex and thorough understanding of the real environment such that objects in the virtual environment do not conflict with objects in the real environment. It can further be desirable to maintain a persistency in the virtual environment that corresponds with a consistency in the real environment. For example, it can be desirable for a virtual object displayed on a physical table to appear at the same location even if a user looks away, moves around, and then looks back at the physical table. To achieve this type of immersion, it can be beneficial to develop an accurate and precise estimate of where objects are in the real world and where a user is in the real world.

For instance, LiDAR sensors may be used to perceive the environment (e.g., in robotic applications). SLAM techniques using LiDAR (or similar sensors) may be used for indoor applications, such as autonomous security, cleaning, and delivery robots, and including augmented reality (AR) applications. Compared to SLAM using only sensors such as visual cameras, LiDAR SLAM can yield a denser 3D map, which may be important for computer vision tasks, such as AR, and 3D object classification and semantic segmentation. In addition, dense 3D mapping may also have applications in the construction industry. A 3D map of a building may be used for decoration design, and enable architects to monitor whether a building meets the design requirement during the construction process. However, performing indoor SLAM with sensors such as LiDAR sensors may be challenging.

Compared to outdoor environments, indoor environments may be more structured. For example, indoor environments may be more likely to feature predictable geometry (e.g., planar surfaces, right angles) and consistent lighting. While these characteristics can simplify tasks such as object recognition, the more structured indoor environment presents its own set of challenges. For instance, in indoor environments, GPS signals may not available, which can make loop closure detection for LiDAR (or similar sensors) SLAM difficult. Additionally, when detecting a planar surface, such as a wall or a door in an indoor environment, with a sensor, it can be ambiguous which of the two sides of the surface faces the sensor. This is referred to herein as the "double-side" issue. For instance, in an outdoor environment, a LiDAR generally observes the outside of a building. However, a LiDAR may observe the two sides of a planar object in an indoor environment. As the two sides of a planar object may be typically close to each other, this may cause LiDAR odometry and mapping (LOAM) systems, based on variants of iterative closest point (ICP) techniques, to generate wrong data associations, which may lead to large errors. Additionally, LOAM and its variants may provide a low-fidelity odometry pose estimated by registering a current scan to the last one in real time, and registering a global pose may be much slower. It is desirable to mitigate these effects in order to obtain faster and less error-prone observations across a variety of sensor environments.

Planes may be used in conventional LiDAR SLAM methods, and may be generally used in variants of the ICP framework. In some conventional methods, however, planes may not be explicitly extracted. For example, planes may be used in plane-to-plane ICP framework, which is a variant of the traditional ICP. In some examples, however, plane parameters may be generally estimated from a small patch of the point cloud obtained from, e.g., a K-nearest neighbor search, and not explicitly extracted. These methods may result in a cycle of increasing errors. For example, the pose errors may accumulate into the point cloud, which may in turn reduce the accuracy of the pose estimation; the inaccurate pose may in turn further degrade the global point cloud. Bundle adjustment (BA) may provide an accurate solution, but performing BA may be time-consuming and computationally intensive.

Additionally, the cost function (e.g., a function for minimizing algebraic errors or for minimizing geometric or statistical distances associated with estimation of geometry from sensor measurements) may affect the accuracy of the solution. It is desirable for a cost function for a geometrical problem to be invariant with respect to a rigid transformation. For plane correspondences, there may be two ways to construct the cost function: a plane-to-plane cost and a point-to-plane cost. The point-to-plane cost can be expressed as the squared distance from a point to a plane, which is invariant to the rigid transformation. The plane-to-plane cost is a measurement of the difference between two plane parameters, which may not be invariant to rigid transformation. Therefore, the point-to-plane cost may generate more accurate results compared to the plane-to-plane cost. However, the point-to-plane cost may result in a larger least-squares problem than the plane-to-plane cost, may be considered unaffordable for more accurate solutions, and may be applicable to a smaller problem (e.g., single scan undistortion and registration, a scan that includes less points than that of a LiDAR or similar sensor).

BRIEF SUMMARY

Disclosed here in are systems and methods for mapping environment information. In some embodiments, the systems and methods are configured for mapping information in a mixed reality environment. In some embodiments, the system is configured to perform a method including scanning an environment including capturing, with a sensor, a plurality of points of the environment; tracking a plane of the environment; updating observations associated with the environment by inserting a keyframe into the observations; determining whether the plane is coplanar with a second plane of the environment; in accordance with a determination that the plane is coplanar with the second plane, performing planar bundle adjustment on the observations associated with the environment; and in accordance with a determination that the plane is not coplanar with the second plane, performing planar bundle adjustment on a portion of the observations associated with the environment.

In some embodiments, a planar LiDAR SLAM framework for the indoor environment is disclosed. In some embodiments, two sides of a planar object are distinguished by the direction of a vector normal towards an observation center (e.g., of a LiDAR sensor, of a sensor), and the undesirable effects of the double-side issue may be reduced.

In some embodiments, the systems and methods include performing planar bundle adjustment (PBA), which includes jointly optimizing plane parameters and sensor poses. Performing PBA may advantageously reduce pose errors and drift associated with planes that are not explicitly extracted, as described previously.

In some embodiments, LiDAR SLAM systems and methods of operating the systems are disclosed. The systems and methods may advantageously balance accuracy and computational cost of BA. In some embodiments, the system comprises three parallel components including localization, local mapping, and PBA. For example, the localization component tracks planes frame-by-frame, undistorts a LiDAR point cloud, and registers a new scan to the global plane model in real-time. Additionally, the undistortion and registration tasks may be sped up by using an approximate rotation matrix for small motion between two scans. The local mapping and PBA components may correct the drift and improve the map, ensuring that the localization component can provide accurate poses. In some embodiments, the point-to-plane cost includes a special structure, which can be leveraged to reduce computational cost for PBA. Based on this structure, an integral point-to-plane cost is formed and may accelerate local mapping.

DETAILED DESCRIPTION

Figure 1A:
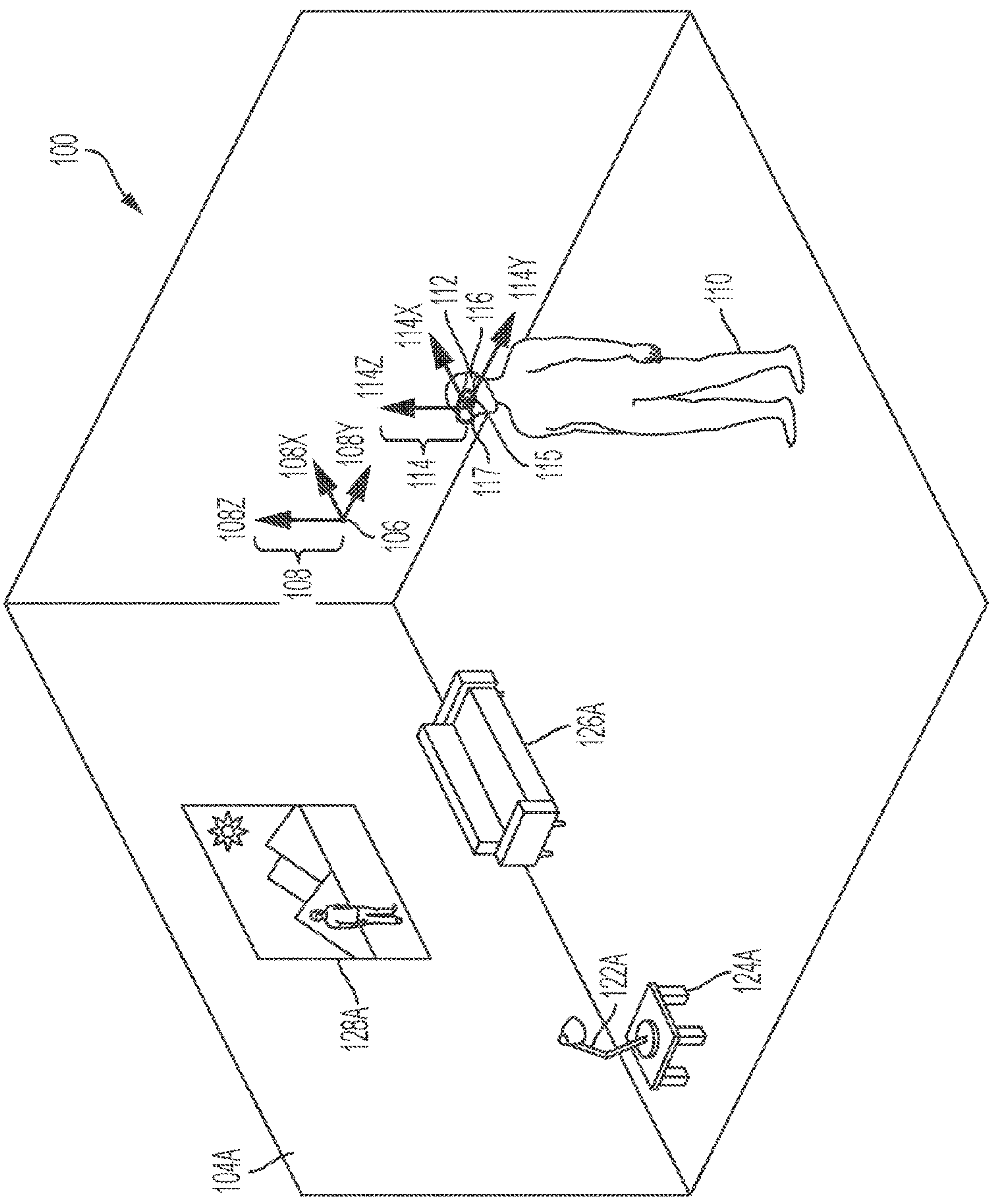
FIGS. 1A-1C illustrate exemplary mixed reality environments, according to embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display) and one or more speakers, and one or more sensors (e.g., a camera, a LiDAR sensor, a sensor configured to capture a plurality of points during one scan), for example as described herein. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using SLAM, visual odometry, or other techniques, a transformation between user coordinate system 114 and environment coordinate system 108 can be determined and updated in real-time.

Figure 1B:
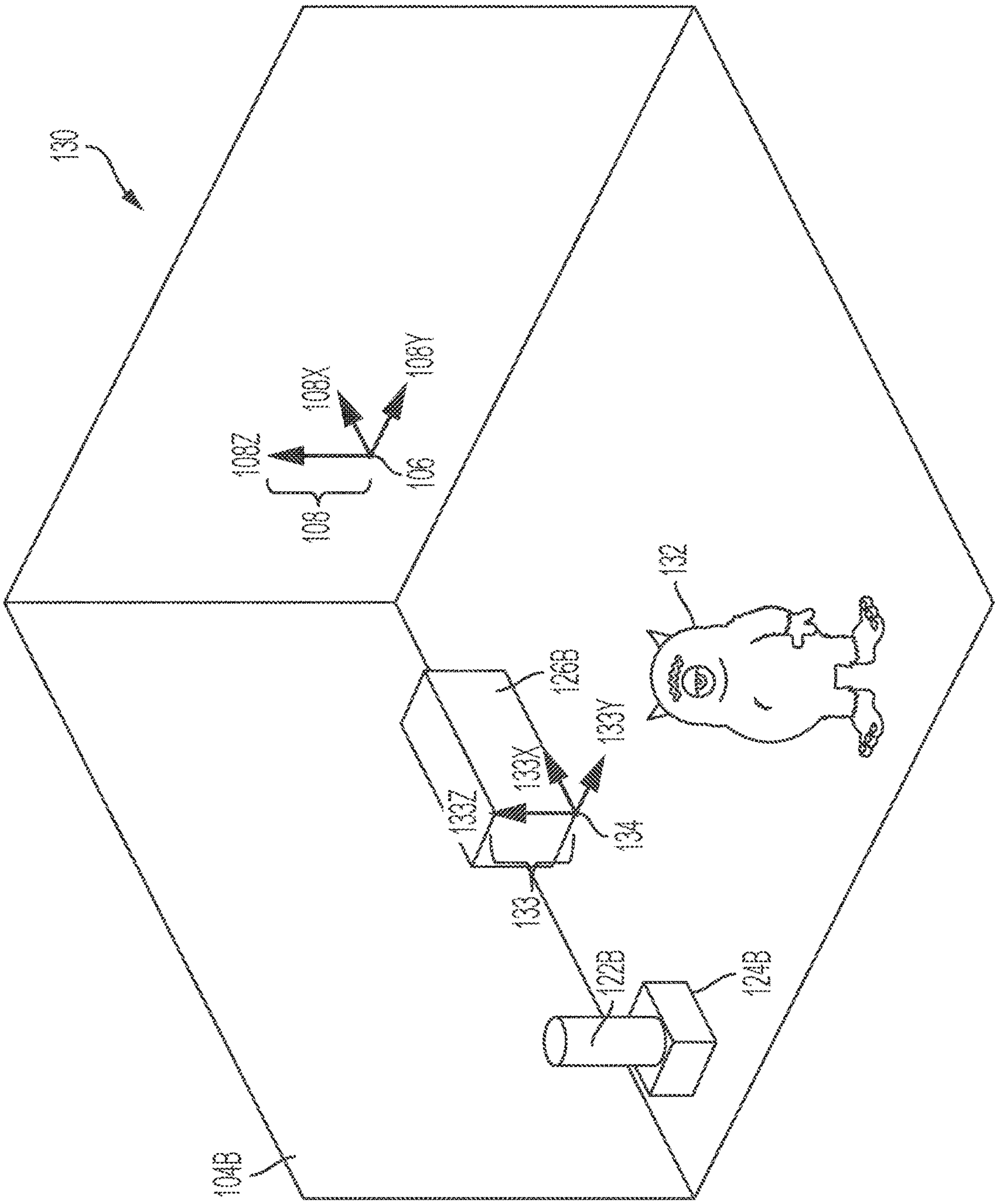

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
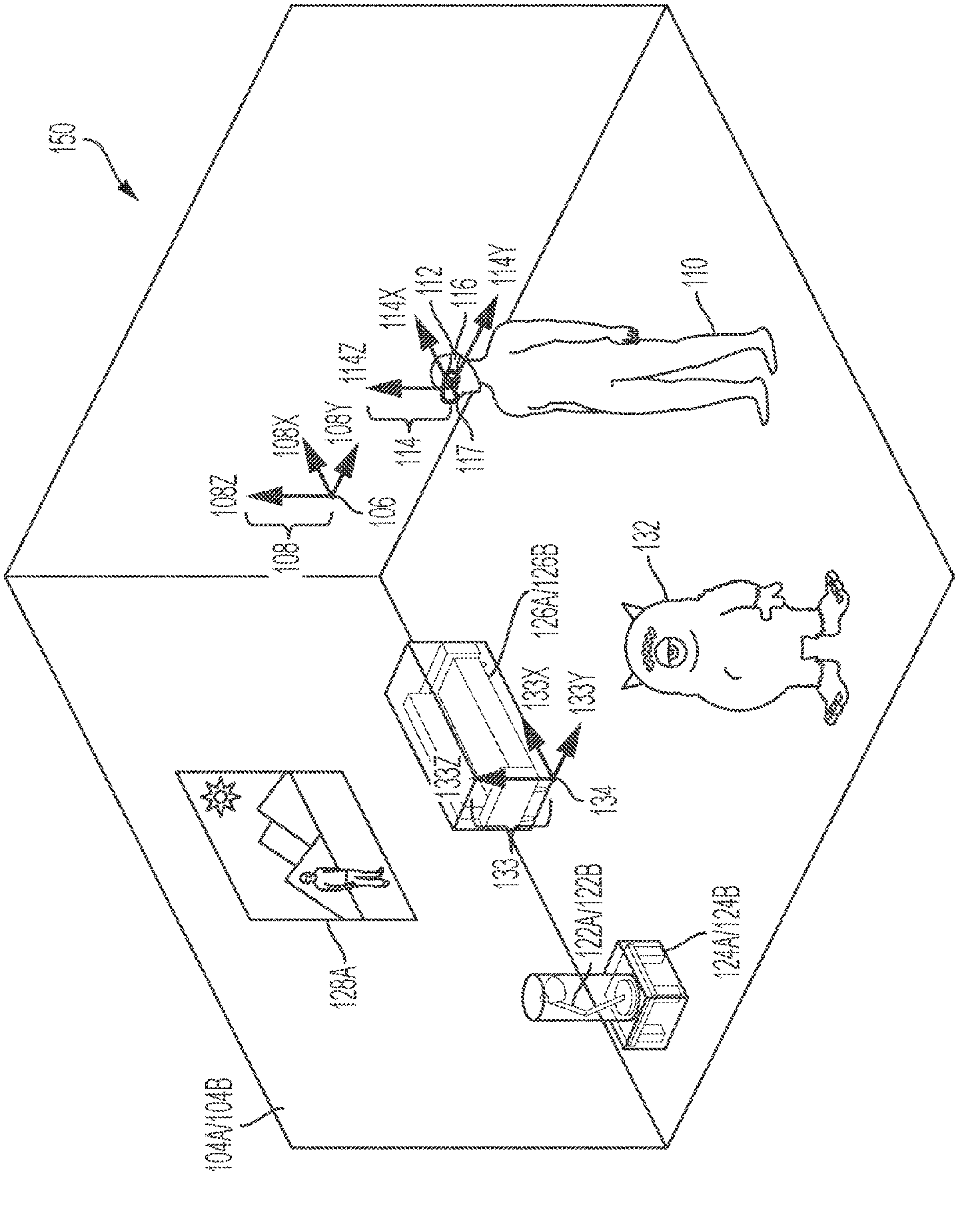

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 may act as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual monster 132 could be associated with one or more audio signals, such as a footstep sound effect that is generated as the monster walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Exemplary mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic, a LiDAR sensor, a sensor configured to scan a plurality of points during one scan). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a SLAM, visual odometry, and/or LiDAR odometry algorithm. In some examples, mixed reality system 112 may also include a handheld controller 300, and/or an auxiliary unit 320, which may be a wearable beltpack, as described further herein.

Figure 2A:
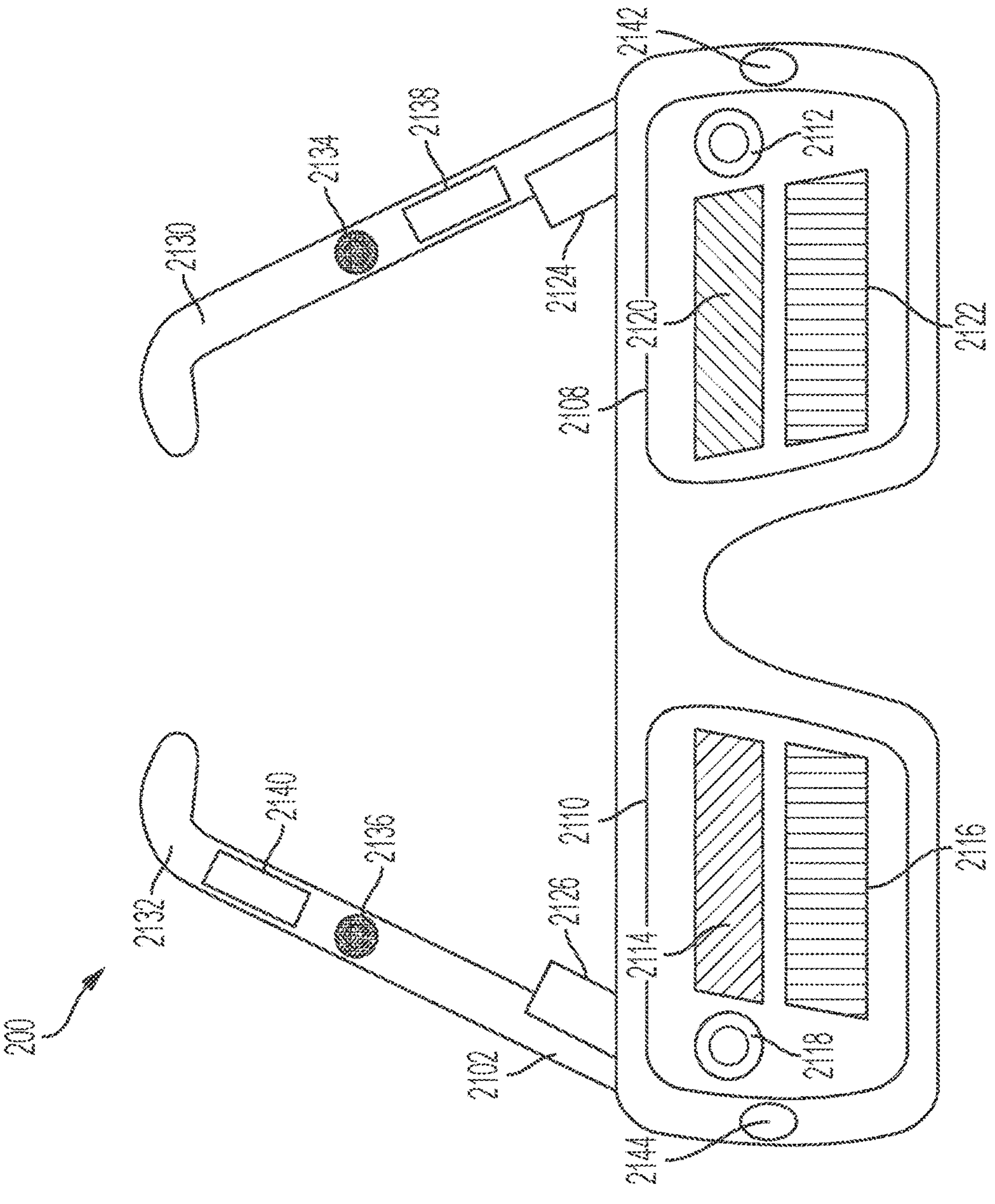
FIGS. 2A-2D illustrate components of exemplary mixed reality systems, according to embodiments of the disclosure.
Figure 2B:
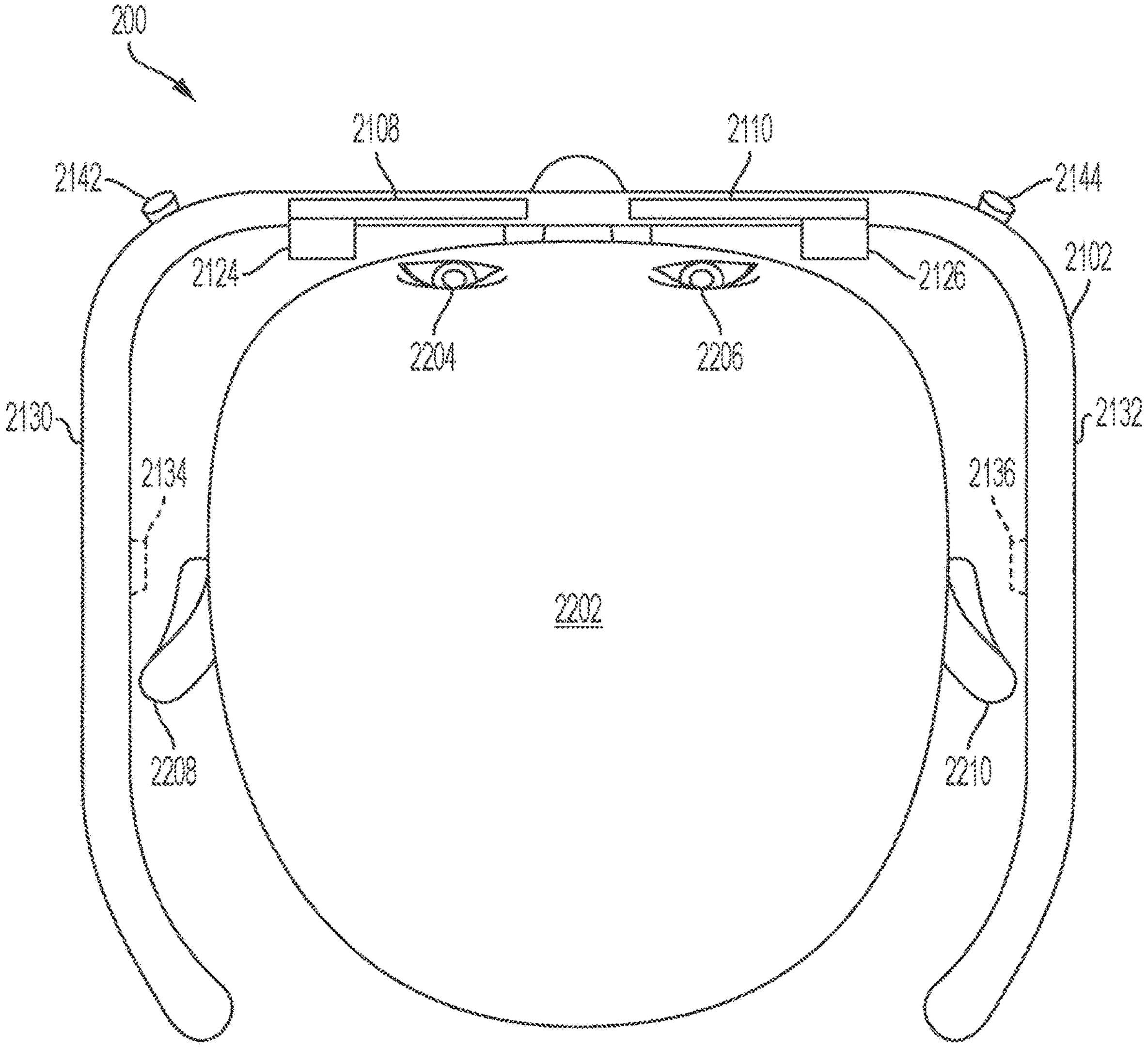
Figure 2C:
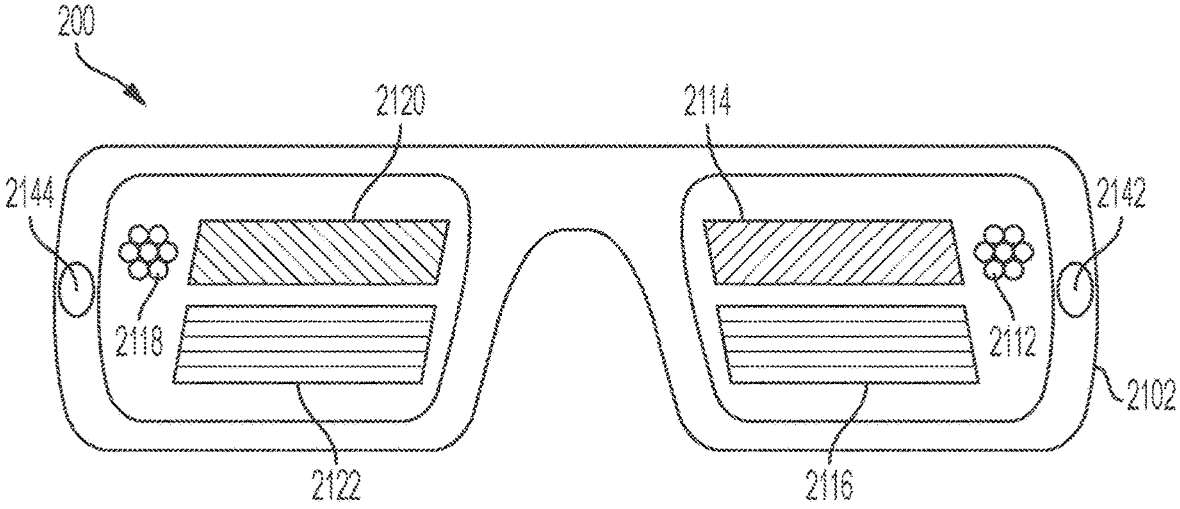
Figure 2D:
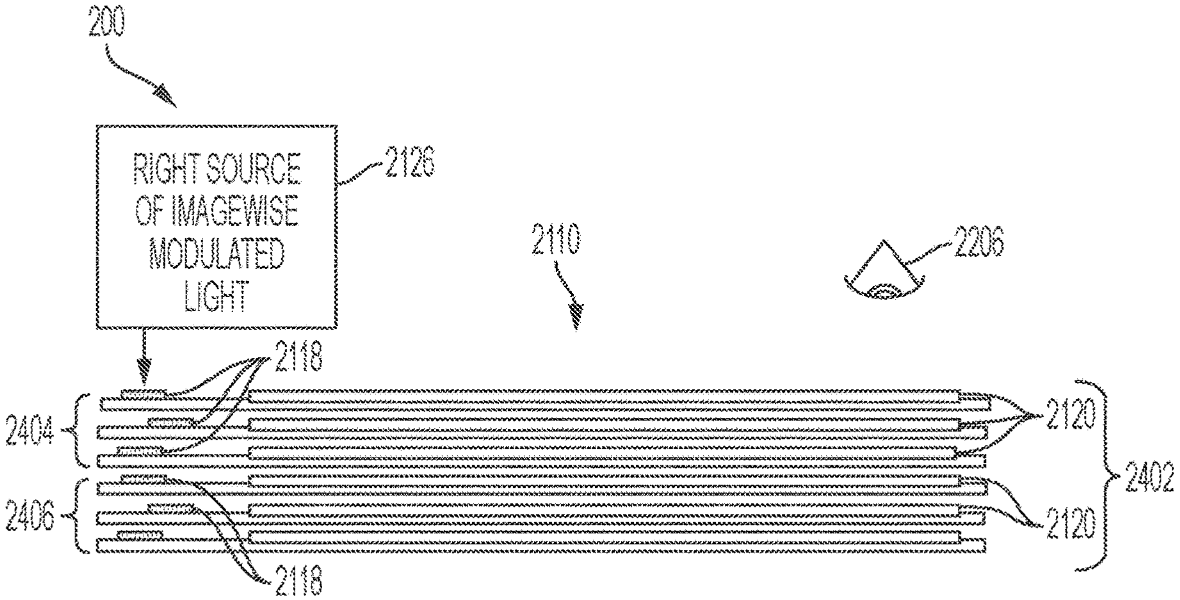

FIGS. 2A-2D illustrate components of an exemplary mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
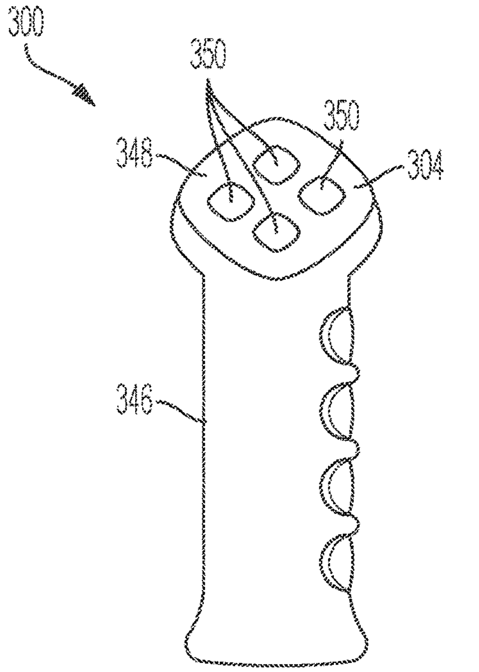
FIG. 3A illustrates an exemplary mixed reality handheld controller, according to embodiments of the disclosure.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera, LiDAR, or other sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
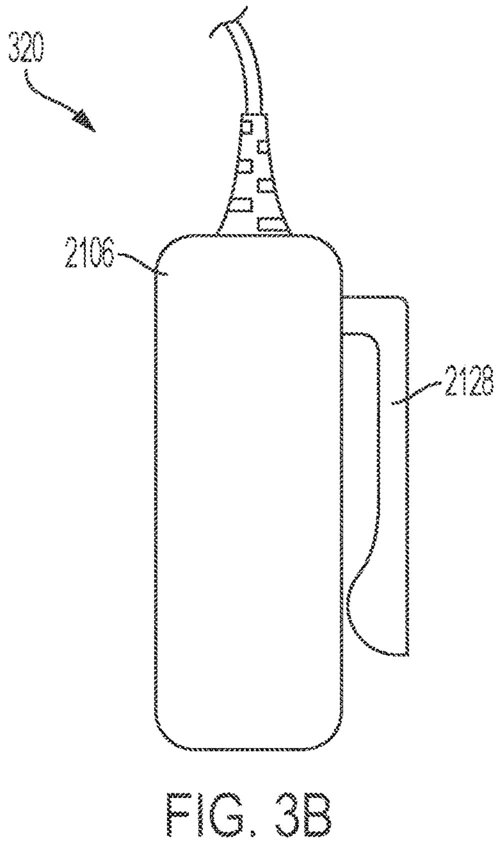
FIG. 3B illustrates an exemplary auxiliary unit, according to embodiments of the disclosure.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
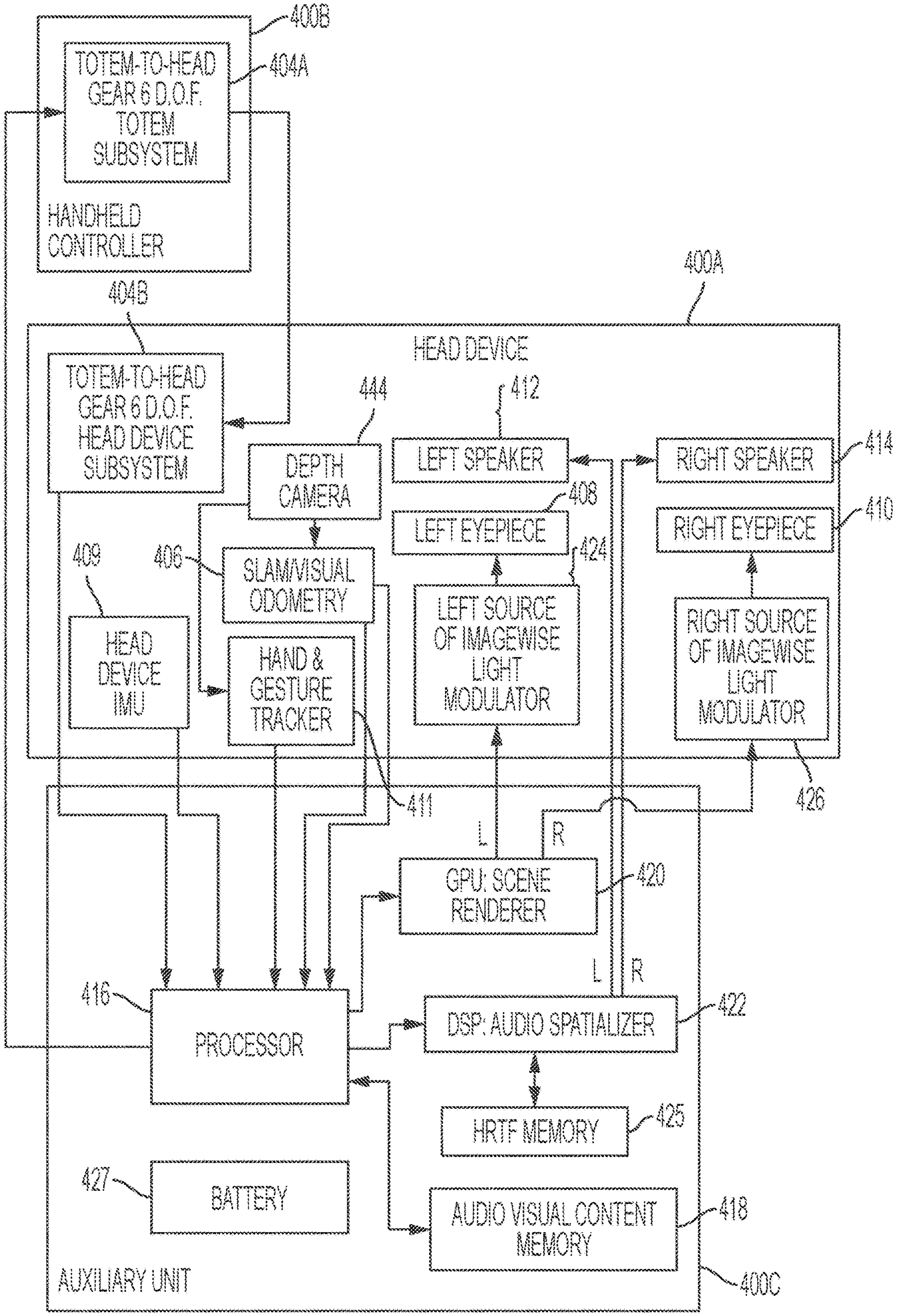
FIG. 4 illustrates an exemplary functional block diagram for an example mixed reality system, according to embodiments of the disclosure.

FIG. 4 shows an exemplary functional block diagram that may correspond to an exemplary mixed reality system, such as mixed reality system 200 described herein (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described herein with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an exemplary mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Displaying virtual content in a mixed reality environment such that the virtual content corresponds to real content can be challenging. For example, it can be desirable to display a virtual object 122B in FIG. 1C in the same location as real object 122A. To do so can involve a number of capabilities of mixed reality system 112. For example, mixed reality system 112 may create a three-dimensional map of real environment 104A and real objects (e.g., lamp 122A) within real environment 104A. Mixed reality system 112 may also establish its location within real environment 104A (which can correspond to a user's location within the real environment). Mixed reality system 112 may further establish its orientation within real environment 104A (which can correspond to a user's orientation within the real environment). Mixed reality system 112 may also establish its movement relative to real environment 104A, for example, linear and/or angular velocity and linear and/or angular acceleration (which can correspond to a user's movement relative to the real environment). SLAM can be one method to display a virtual object 122B in the same location as real object 122A even as a user 110 moves around room 104A, looks away from real object 122A, and looks back at real object 122A. In some examples, SLAM calculations such as described herein can be executed in a mixed reality system 112 via a SLAM/visual odometry block 406 described above. In some examples, SLAM calculations can be executed via processor 416, GPU 420, and/or any other suitable component of mixed reality system 112. SLAM calculations such as described herein can make use of any suitable sensors of mixed reality system 112 such as described herein.

It can be desirable to run SLAM in an accurate, but computationally efficient and low-latency manner. As used herein, latency can refer to the time delay between a change in a position or orientation of a component of a mixed reality system (e.g., a rotation of a wearable head device), and the reflection of that change as represented in the mixed reality system (e.g., a display angle of a field of view presented in a display of the wearable head device). Computational inefficiency and/or high latency can negatively impact a user's experience with mixed reality system 112. For example, if a user 110 looks around room 104A, virtual objects may appear to "jitter" as a result of the user's motion and/or high latency. Accuracy can be critical to produce an immersive mixed reality environment, otherwise virtual content that conflicts with real content may remind a user of the distinction between virtual and real content and diminish the immersion of the user. Further, in some cases, latency can result in motion sickness, headaches, or other negative physical experiences for some users. Computational inefficiency can produce exacerbated problems in embodiments where mixed reality system 112 is a mobile system that depends on a limited power source (e.g., a battery). Systems and methods described herein can produce an improved user experience as a result of more accurate, computationally efficient, and/or lower latency SLAM.

Figure 5:
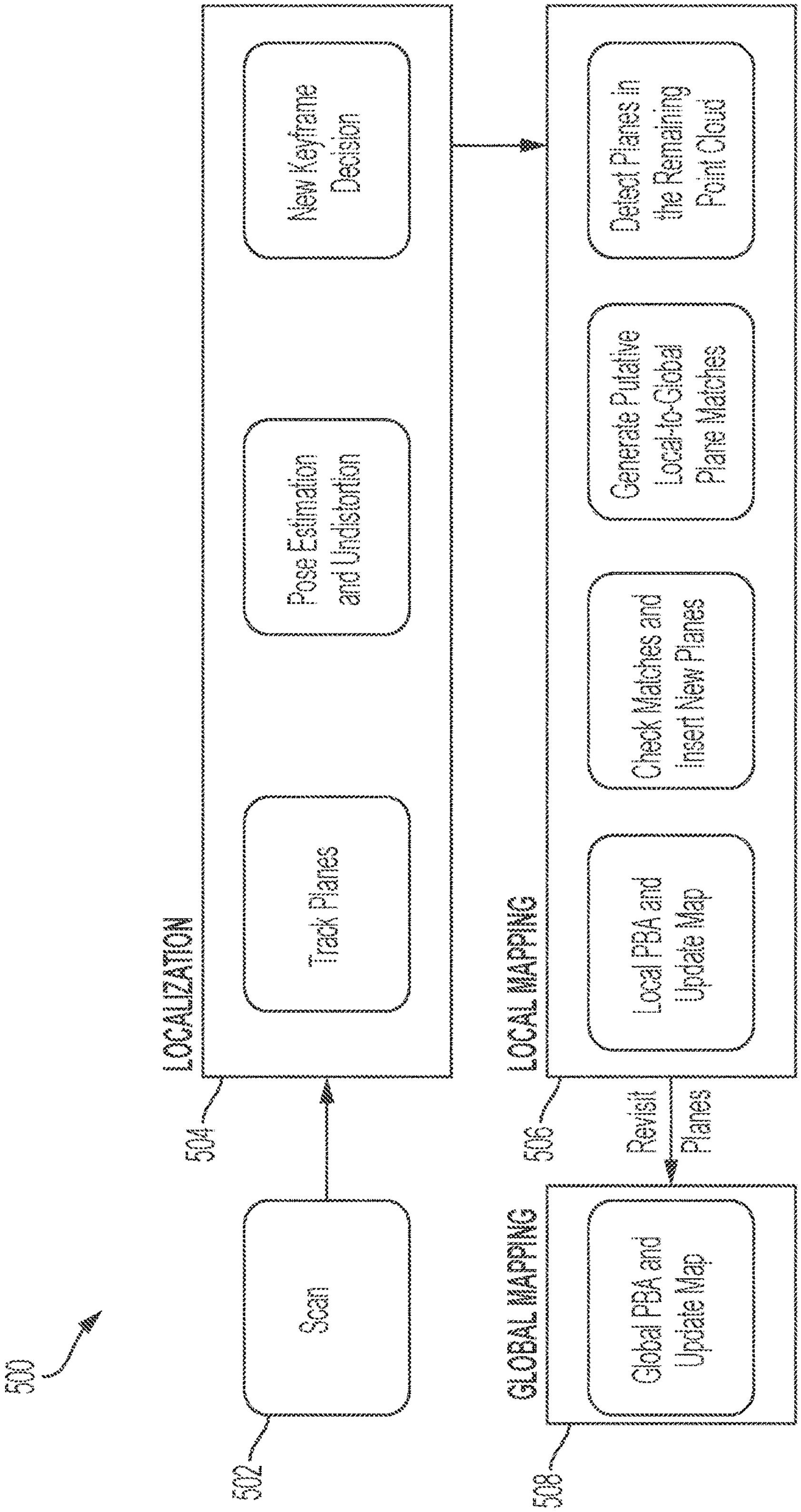
FIG. 5 illustrates an exemplary SLAM system, according to embodiments of the disclosure.

FIG. 5 illustrates an exemplary method 500 of operating a SLAM system, according to embodiments of the disclosure. The method 500 advantageously allows LiDAR or similar sensors (e.g., sensors configured to capture a plurality of points during a scan) to be efficiently used for a SLAM system (e.g., for environmental mapping applications, for mixed reality mapping applications). Although the method 500 is illustrated as including the described elements, it is understood that different orderings of elements, additional elements, or fewer elements may be included without departing from the scope of the disclosure.

In some embodiments, the method 500 allows two sides of a planar object to be distinguished by the direction of a vector normal towards an observation center (e.g., of a LiDAR sensor, of a sensor), and the undesirable effects of the double-side issue may be reduced. For example, the observation center is an origin of a depth sensor (e.g., a LiDAR sensor, a sensor disclosed herein) coordinate system.

In some embodiments, the method 500 includes performing PBA, which includes jointly optimizing plane parameters and sensor poses. Performing PBA may advantageously reduce pose errors and drift associated with planes that are not explicitly extracted.

In some embodiments, the method 500 may advantageously balance accuracy and computational cost of BA. In some embodiments, the method 500 comprises three parallel components including localization, local mapping, and PBA. For example, the localization component tracks planes frame-by-frame, undistorts a LiDAR point cloud, and registers a new scan to the global plane model in real-time. Additionally, the undistortion and registration tasks may be sped up by using an approximate rotation matrix for small motion between two scans. The local mapping and PBA components may correct the drift and improve the map, ensuring that the localization component can provide accurate poses. In some embodiments, the point-to-plane cost includes a special structure, which can be leveraged to reduce computational cost for PBA. Based on this structure, an integral point-to-plane cost is formed and may accelerate local mapping.

Although some examples herein are described with respect to LiDAR systems, it is understood these descriptions are exemplary. While LiDAR sensors are expressly described, it is understood that other sensors or more specific kinds of sensors (e.g., a sensor configured to capture a plurality of points during a scan, a depth sensor, a sensor providing depth information, mechanical spinning LiDAR, solid-state LiDAR, RGBD camera) may be used to perform the described operations, be incorporated into the described systems, and achieve similar described benefits without departing from the scope of the disclosure. In addition, it is contemplated that the use of LiDAR sensors (or similar sensors) may be supplemented by the use of other sensors, such as depth cameras, RGB cameras, acoustic sensors, infrared sensors, GPS units, and/or inertial measurement units (IMUs), as appropriate. For example, such supplemental sensors can be used in conjunction with LiDAR to refine data provided by LiDAR sensors, to provide redundancy, or to permit reduced-power operation.

The examples herein may be performed with a device including a LiDAR or similar sensor, such as an mixed reality device (e.g., mixed reality system 112, mixed reality system 200, mixed reality system described with respect to FIG. 4), a mobile device (e.g., a smartphone or tablet), or a robotic device, and/or may be performed with a first device (e.g., a cloud computing device, a server, a computing device) configured to communicate with a second device (e.g., a device configured to transmit and/or receive environment mapping information, a device including a LiDAR or similar sensor, a device not including a LiDAR or similar sensor configured to receive environment mapping information) (e.g., to simplify or reduce requirements of the second device).

In some embodiments, results (e.g., PBA results, point clouds, keyframes, poses, calculation results) from the systems or methods performed herein are stored in a first device using the results (e.g., to obtain environment mapping information) and/or in a first device configured to communicate with a second device, the second device configured to request and/or receive the results (e.g., to obtain environment mapping information). By storing the results, a time associated with processing and/or obtaining environment mapping information may be reduced (e.g., the results do not need to be recomputed, the results may be computed on a faster device), and processing and/or obtaining environment mapping information may be simplified (e.g., the results do not need to be computed on a slower and/or a battery-consuming device).

In some embodiments, instructions for performing the methods described herein are pre-loaded into the device (e.g., pre-installed into the device prior to using the device). In some embodiments, instructions for performing methods described herein may be downloaded into a device (e.g., installed into the device at a later time). In some embodiments, the methods and operations described herein may be performed offline (e.g., the mapping is performed offline while a system using the mapping is not active). In some embodiments, the methods and operations described herein may be performed in real-time (e.g., the mapping is performed real-time while a system using the mapping is active).

In some embodiments, a LiDAR scan $\mathbb{S}$ includes a set of points that may or may not be captured at a same time. The pose of scan $\mathbb{S}$ may be defined as a rigid transformation of a LiDAR frame relative to a global frame at a time when a last point in $\mathbb{S}$ was captured. As described herein, a rigid transformation may be represented as rotation and translation:

$$(R, t) \in SO(3) \times \mathbb{R}^3$$

The transformation may be associated with a transformation matrix:

$$T = \begin{bmatrix} R & t \\ 0 & 1 \end{bmatrix} \in SE \quad (3)$$

In some embodiments, a rotational matrix R lies in a special orthogonal group SO(3). To represent R, an angle-axis parameterization $\omega=[\omega_1; \omega_2; \omega_3]$ may be used; T may be parameterized as $x=[\omega; t]$ (e.g., for optimizations described herein). The skew matrix of $\omega$ may be defined as:

$$[\omega]_x = \begin{bmatrix} 0 & -\omega_3 & \omega_2 \\ \omega_3 & 0 & -\omega_1 \\ -\omega_2 & \omega_1 & 0 \end{bmatrix} \quad (1)$$

In the above, $[\omega]_x$ lies in a tangent space so(3) of the manifold SO(3) at the identity. The exponential map exp : so(3)→SO(3) may be expressed as:

$$\exp([\omega]_x) = I + \frac{\sin(\|\omega\|)}{\|\omega\|} + \frac{1-\cos(\|\omega\|)}{\|\omega\|^2}[\omega]_x^2 \quad (2)$$

Planar objects may have two sides, and in some instances, the two sides are close to each other. As discussed above, the proximity of the two sides of a planar object may cause ambiguity errors, in which it is ambiguous which side of the planar object faces a sensor (e.g., double-side issue). For instance, a robot may enter a room and erroneously capture a side of a wall that lies opposite from the intended side. Two sides of a planar object may be distinguished by identifying a vector normal to the plane and directed towards an observation center (e.g., a center of a LiDAR sensor, a center of a sensor).

A plane may be represented by $\pi=[n; d]$, where n is a normal vector towards the observation center with $\|n\|=1$, and d is a signed distance from an origin to the plane. To parameterize a plane, a closet-point (CP) vector, $\eta=nd$, may be used.

As discussed, a plane may be represented by $\pi$. The plane $\pi$ may be expressed in a global coordinate system, and p is an observation of $\pi$ in a local coordinate system. The transformation matrix from the local coordinate system to the global coordinate system may be T, as discussed above. $\bar{p}=[p; 1]$ may be a homogenous coordinate system of p. A point-to-plane residue $\delta$ may be expressed as follows:

$$\delta = \pi^T T \bar{p} \tag{3}$$

In some embodiments, the method 500 includes performing a new scan (e.g., a scan $\mathbb{S}$) (step 502). For example, a new LiDAR scan is performed. As another example, a scan comprising a plurality of points (e.g., tens of points, hundreds of points, thousands of points) is performed.

In some embodiments, the LiDAR sensor starts from a static status, such that the first frame does not suffer from motion distortion. Planes may be extracted from a LiDAR point cloud using any suitable method. For example, planes may be extracted based on a region grow method; a normal of each point may be estimated, and the point cloud may be segmented by clustering points with similar normal. For each cluster, a RANSAC or similar algorithm may be used to detect a plane. In some embodiments, a plane including more than a threshold amount of points (e.g., 50) is kept, and a plane including less than the threshold amount of points is discarded.

In some embodiments, the method 500 includes performing localization (step 504). Performing localization may include tracking planes (e.g., tracking frame-by-frame, tracking scan-by-scan). Each local plane may be associated with a global plane, and this relationship may be maintained during tracking. By tracking planes frame-by-frame or scan-by-scan, computational time may be saved because data association between global planes and local observations may be kept. As another exemplary advantage, due to the local-to-global plane correspondences, point-to-plane cost is allowed to simultaneously undistort a point cloud (e.g., global point cloud) and estimate a pose. A first-order approximation of a rotation matrix (as described herein) may be used to simplify computation. Performing localization may also include registering a current scan into a global point cloud.

For example, a scan $\mathbb{S}_k$ and $\mathbb{S}_{k-1}$ are two consecutive scans, $\mathbb{P}_{k-1,i}$ is a set of points of the ith plane detected in $\mathbb{S}_{k-1}$ a parameter and $\pi_{k-1,i}$ and $\mathbb{P}_{k-1,i}$ is associated with the $m_i$th global plane $$\pi^g_{m_i}.$$

A set of local-to-global point-to-plane correspondences may be expressed as $$\mathbb{P}_{k-1,i} \leftrightarrow \pi^g_{m_i}.$$

According to an example method, a KD tree may be built for $\mathbb{S}_k$. For each point $p_{k-1,i,j} \in \mathbb{P}_{k-1,i}$, n nearest neighbors (e.g., n=2) in $\mathbb{S}_k$ are found. Redundant points may be eliminated to obtain a point set $\tilde{\mathbb{P}}_{k,i}$. A RANSAC algorithm (or another suitable algorithm) may be applied to fit a plane $\pi_{k,i}$ from $\tilde{\mathbb{P}}_{k,i}$ and to obtain an inlier set $\mathbb{P}_{k,i}$. $\mathbb{P}_{k,i}$ may be expanded by collecting nearby points smaller than a threshold distance (e.g., 5 cm) from $\pi_{k,i}$. If the number of points in $\mathbb{P}_{k,i}$ is larger than a threshold value (e.g., 50) and an angle between $\pi_{k,i}$ and $\pi_{k-1,i}$ is smaller than threshold angle (e.g., 10 degrees), a set of point-to-plane correspondences $$\mathbb{P}_{k,i} \leftrightarrow \pi^g_{m_i}$$

may be obtained for scan $\mathbb{S}_k$.

Figure 6:
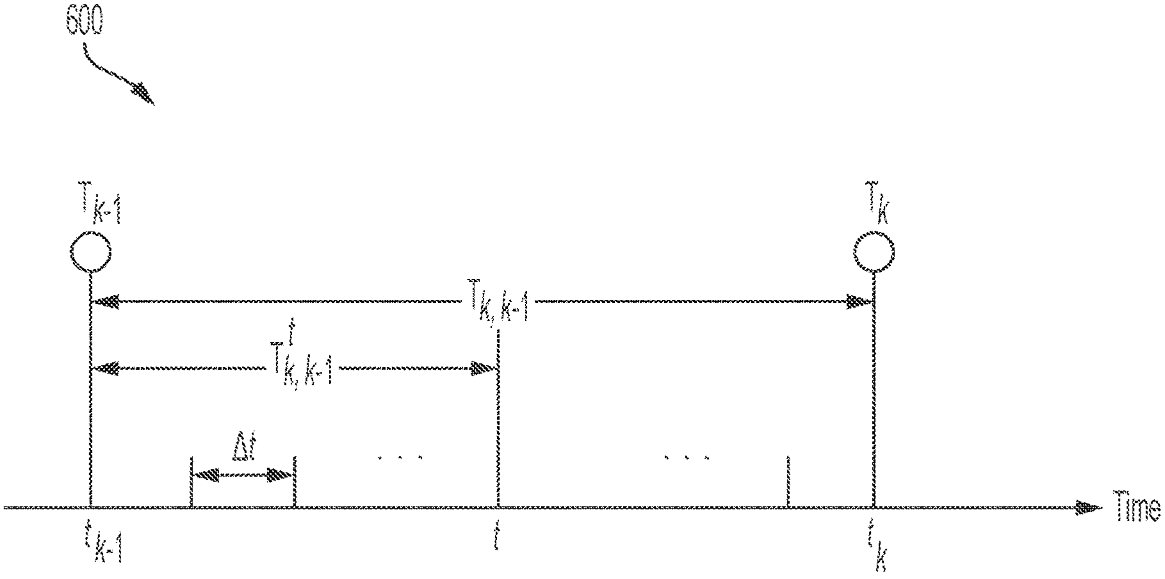
FIG. 6 illustrates an exemplary timing diagram of a SLAM system, according to embodiments of the disclosure.

FIG. 6 illustrates an exemplary timing diagram 600 of a SLAM system, according to embodiments of the disclosure. The timing diagram may illustrate points captured during scans. For example, points in $\mathbb{S}_k$ may be captured during $[t_{k-1}, t_k]$ with an interval $\Delta t$. For a point (e.g., a LiDAR point, a sensor point) at time $t \in [t_{k-1}, t_k]$, the pose $$T^t_{k,k-1}$$

may be obtained by interpolating (e.g., linearly interpolating) a relative pose $T_{k,k-1}$ between $T_{k-1}$ and $T_k$.

Returning to example method 500, performing localization may also include performing pose estimation and/or pose undistortion. For example, a rigid transformation between scan k−1 and scan k may be defined as $T_{k,k-1}$, and $(R_{k,k-1}, t_{k,k-1})$ may be the corresponding rotation and translation. $\omega_{k,k-1}$ may be an angle-axis representation of $R_{k,k-1}$, and $x_{k,k-1}=[\omega_{k,k-1}; t_{k,k-1}]$ maybe used to parameterize $T_{k,k-1}$.

A rigid transformation at a last point of a scan k−1 and scan k may be $T_{k-1}$ and $T_k$, respectively. The relationship between $T_{k-1}$, $T_k$, and $T_{k,k-1}$ may be given by:

$$T_k = T_{k-1} T_{k,k-1} \tag{4}$$

If $x_{k,k-1}$ is calculated, then $T_{k,k-1}$ may be obtained, and $T_k$ may be solved.

The measurements of a LiDAR may be obtained at different times. When the LiDAR is moving while the measurements are obtained, the LiDAR point cloud may be distorted by the motion. The distortion may be reduced by interpolating (e.g., linearly interpolating) the pose for each point. $t_{k-1}$ and $t_k$ may be times of the last point of scans k−1 and k, respectively. For $t \in (t_{k-1}, t_k]$, s may be defined as follows:

$$s = \frac{t - t_{k-1}}{t_k - t_{k-1}} \tag{5}$$

Then $$R^t_{k,k-1} \text{ and } t^t_{k,k-1}$$

of the rigid transformation $$T^{t}_{k,k-1}$$

at $t\in[t_{k-1}, t_k]$ may be estimated by linear interpolation:

$$R^{t}_{k,k-1}=\exp(s[\omega_{k,k-1}]_\times),\ t^{t}_{k,k-1}=st_{k,k-1} \tag{6}$$

As discussed above, a set of point-to-plane correspondences $$\mathbb{P}_{k,i}\leftrightarrow\pi^{g}_{m_i}$$

may be obtained for scan $\mathbb{S}_k$.

$$\pi^{g}_{m_i}=\left[n^{g}_{m_i};d^{g}_{m_i}\right]$$

and the jth point $p_{k,i,j}\in\mathbb{P}_{k,i}$ may be captured at time $t_{k,i,j}$. The residual for $$p_{k,i,j}\leftrightarrow\pi^{g}_{m_i}$$

may be written as:

$$\delta_{k,i,j}(x_{k,k-1})=\left(\pi^{g}_{m_i}\right)^{T}T_{k-1}T^{t_{k,i,j}}_{k,k-1}\overline{p}_{k,i,j} \tag{7}$$

The following equation may be defined:

$$l^{g}_{m_i}=\left(\pi^{g}_{m_i}\right)^{T}T_{k-1} \tag{8}$$

By substituting equation (8) into (7):

$$\delta_{k,i,j}(x_{k,k-1})=l^{g}_{m_i}T^{t_{k,i,j}}_{k,k-1}\overline{p}_{k,i,j} \tag{9}$$

There may be $N_k$ sets of point-to-plane correspondences $$\left\{\mathbb{P}_{k,i}\leftrightarrow\pi^{g}_{m_i}\right\}_{i=1}^{N_k},$$

and $\mathbb{P}_{k,i}$ may have $N_{k,i}$ points. The least-squares cost function for $x_{k,k-1}$ may be:

$$\min_{x_{k,k-1}}\sum\nolimits_{i=1}^{N_k}\sum\nolimits_{j=1}^{N_{k,i}}\delta_{k,i,j}(x_{k,k-1}) \tag{10}$$

The least-squares problem presented by equation (10) may be solved by the Levenberg-Marquardt (LM) method.

In some embodiments, motion within a scan is small. Therefore, $$R^{t}_{k,k-1}$$

(e.g., from equation (6)) may be approximated by a first-order Taylor expansion:

$$R^{t}_{k,k-1}\approx I+s[\omega_{k,k-1}]_\times \tag{11}$$

Additionally, the following may be defined:

$$l^{g}_{m_i}=\left[a^{g}_{m_i},b^{g}_{m_i},c^{g}_{m_i},d^{g}_{m_i}\right],\ \overline{p}_{k,i,j}=[x_{k,i,j},y_{k,i,j},z_{k,i,j},1]^{T} \tag{12}$$

By substituting the first order approximation in equation (11) and the definitions of equations (12) into equation (9) and expanding (9), linear constraint on $x_{k,k-1}$ may be obtained:

$$a_{k,i,j}x_{k,k-1}=b_{k,i,j},\ \text{where} \tag{13}$$

$$\begin{aligned}a_{k,i,j}&=s_{k,i,j}\cdot\left[c^{g}_{m_i}y_{k,i,j}-b^{g}_{m_i}z_{k,i,j},\right.\\&\left.a^{g}_{m_i}z_{k,i,j}-c^{g}_{m_i}x_{k,i,j},\ b^{g}_{m_i}x_{k,i,j}-a^{g}_{m_i}y_{k,i,j},\ a^{g}_{m_i},\ b^{g}_{m_i},\ c^{g}_{m_i}\right],\\b_{k,i,j}&=-\left(a^{g}_{m_i}x_{k,i,j}+b^{g}_{m_i}y_{k,i,j}+c^{g}_{m_i}z_{k,i,j}+d^{g}_{m_i}\right),\\s_{k,i,j}&=\frac{t_{k,i,j}-t_{k-1}}{t_k-t_{k-1}}\end{aligned}$$

By stacking all of the constraints from $$\left\{\mathbb{P}_{k,i}\leftrightarrow\pi^{g}_{m_i}\right\}_{i=1}^{N_k},$$

a linear system for $x_{k,k-1}$ may be obtained:

$$A_kx_{k,k-1}=b_k \tag{14}$$

Thus, a close-formed solution may be obtained:

$$x_{k,k-1}=-\left(A_k^{T}A_k\right)^{-1}A_k^{T}b_k.$$

$R_{k,k-1}$ may be recovered by an exponential map (e.g., equation (2)).

In some embodiments, when rotation between $\mathbb{S}_{k-1}$ and $\mathbb{S}_k$ is large, and the first-order Taylor expansion in equation (11) may not sufficiently approximate equation (2). When rotation between $\mathbb{S}_{k-1}$ and $\mathbb{S}_k$ is large, the solution may be iteratively refined. For example, an initial estimation $$x^{0}_{k,k-1}$$

based on equation (14) may generate an initial transformation matrix $$T^{0}_{k,k-1}.$$

From the initial estimation and equation (2), $$\|\omega^{0}_{k,k-1}\|_2$$

may be calculated. If $$\|\omega^{0}_{k,k-1}\|_2$$

is greater than a degree threshold (e.g., one degree), then the following may be updated:

$$\overline{p}_{k,i,j} = T^{0,t_{k,i,j}}_{k,k-1}\overline{p}_{k,i,j}, \text{ where } T^{0,t_{k,i,j}}_{k,k-1}$$

is the linear interpolation of $$T^{0}_{k,k-1}$$

at time $t_{k,i,j}$, calculated by equation (6).

Based on the updates, a new $\overline{p}_{k,i,j}$ may be used to generate a new linear system for equation (14). The new linear system may be solved to obtain $$x^{1}_{k,k-1}$$

and subsequently $$T^{1}_{k,k-1}.$$

These steps are repeated until $$\|\omega^{0}_{k,k-1}\|_2$$

is less than the degree threshold (e.g., one degree). For example, if n iterations are performed, then a final result for $T_{k,k-1}$ may be recovered by:

$$T_{k,k-1} = T^{n}_{k,k-1}T^{n-1}_{k,k-1} \cdots T^{0}_{k,k-1} \tag{15}$$

Performing localization may also include determining whether a new keyframe needs to be inserted. For example, a new keyframe needs to be inserted if one of the following conditions is met: (1) the distance between a current scan and a last keyframe is larger than a threshold distance (e.g., 0.2 m) or (2) a threshold percentage (e.g., 20%) of points in a current scan are not tracked. In accordance with a determination that a new keyframe needs to be inserted, a new keyframe is inserted. In some embodiments, in response to a new keyframe being inserted, local mapping is performed. In some examples, when one of these conditions is met and local mapping for a last keyframe has been performed, then local mapping is performed for the newly inserted keyframe.

In some embodiments, the method 500 includes performing local mapping (step 506). During local mapping, keyframe poses within a window and/or planes observed by these keyframes may be optimized, while keyframe poses outside of the window are kept fixed. Performing local mapping may include detecting planes in the remaining point cloud.

As an example, for a new keyframe, the corresponding scan may be undistorted by applying the transformation of equation (6). Then, planes for points that have not been tracked and planes including more than a threshold amount of points (e.g., 50) are kept.

Performing local mapping may include generating putative local-to-global matches. For example, using a known pose, new local planes from this detection may be matched with global planes. A plane normal may first be used to select a candidate global plane. For instance, global planes whose normals are nearly parallel (e.g., having an angle between them less than a threshold angle (e.g., 10 degrees)) to the local plane are considered.

Performing local mapping may include checking for matches and inserting new planes. For example, distances between the local planar points to candidate global planes (e.g., selected from the step described above) may be computed, and a candidate associated with a minimal average distance is kept. For the candidates that are kept, if a threshold percentage (e.g., 90%) of point-to-plane distances is less than a threshold distance $\gamma$, then this correspondence is accepted. If a threshold percentage (e.g., 90%) of point-to-plane distances is less than twice the threshold distance $\gamma$, then a further geometric consistency check may be performed (GCC). If neither of these conditions is met, then a new global plane is introduced.

GCC may be performed to further verify correspondence between a local plane and a candidate global plane (e.g., identified based on the step described above). A linear system, described in equation (14), may be constructed and denoted as $$A^{o}_{k}x_{k,k-1} = b^{o}_{k}$$

for original correspondences. Then, a new linear system, denoted as $$A^{i}_{k}x_{k,k-1} = b^{i}_{k}$$

may be constructed for each new correspondence (e.g., the ith new correspondence). The augmented linear system for each new correspondence may be solved:

$$A^{o+i}_{k}\left\{\begin{bmatrix} A^{o}_{k} \\ A^{i}_{k} \end{bmatrix}\right. x^{o+i}_{k,k-1} = \left.\begin{bmatrix} b^{o}_{k} \\ b^{i}_{k} \end{bmatrix}\right\} b^{o+i}_{k} \tag{16}$$

If $$x_{k,k-1}^{o}$$

is a solution of $$A_k^o x_{k,k-1}^o = b_k^o,$$

then the following conditions may be required to meet:

$$\|A_k^o x_{k,k-1}^{o+i} - b_k^o\|_2 < \lambda \|A_k^o x_{k,k-1}^{o+i} - b_k^o\| \quad (A)$$

(B) A threshold percentage (e.g., 90%) of point-to-plane distances are less than a threshold distance $\gamma$ In some embodiments, $\lambda$ set to 1.1. If a new correspondence is added based on the above steps, a pose is re-estimated using all the correspondences, including the new correspondence.

Equation (16) may be efficiently solved by solving the normal equation $$A_k^{o+i^T} A_k^{o+i} x_{k,k-1}^{o+i} = A_k^{o+i^T} b_k^{o+i}.$$

It can be found that $$A_k^{o+i^T} A_k^{o+i} = A_k^{o^T} A_k^o + A_k^{i^T} A_k^i \text{ and } A_k^{o+i^T} b_k^{o+i} = A_k^{o^T} b_k^o + A_k^{i^T} b_k^i,$$

and that the terms $$A_k^{o^T} A_k^o \text{ and } A_k^{o^T} b_k^o$$

may dominate the computation and may be shared among all the new linear systems. Thus, these terms may advantageously only needed be computed once. Additionally, a final linear system including all constraints may be efficiently solved because $$A_k^{o^T} A_k^o,\ A_k^{o^T} b_k^o,\ A_k^{i^T} A_k^i,\ A_k^{i^T} b_k^i$$

are obtained for all i.

Performing local mapping may include performing local PBA and updating a map. For example, if at least one new local-to-global plane correspondence is found (e.g., from the step described above, a local plane is determined to be coplanar with a global plane) or if the SLAM system is initializing, then global PBA (e.g., described with respect to step 508) may be performed. Otherwise, local PBA may be performed.

In some embodiments, local mapping optimizes keyframes within a sliding window and the planes observed by these keyframes. For example, the size of the sliding window is $N_w$, and may be set to 5. The latest $N_w$ keyframes may form a set $\mathbb{W}$, planes observed by the $N_w$ keyframes may form a set $\mathbb{O}$, and keyframes outside of the sliding window that see the planes in the set $\mathbb{O}$ form a set $\mathbb{F}$. The poses of keyframes in $\mathbb{F}$ may be fixed. In some embodiments, during local mapping, the following cost function is minimized:

$$\min_{\substack{x_i,\eta_i \\ i\in 0 \\ j\in\mathbb{W}}} \sum_{i\in\mathbb{W}} \sum_{j\in\mathbb{O}_i} \sum_{k=1}^{K_{ij}} \delta_{ijk}^2(x_i, \eta_i) + \sum_{j\in\mathbb{O}} \sum_{m\in\mathbb{F}_j} \sum_{k=1}^{K_{mj}} \delta_{mjk}^2(\eta_j) \quad (17)$$

Where the first set of summations may be defined as $C_w$, and the second set of summations may be defined as $C_f$. $\mathbb{O}_i$ may be the set of planes observed by the ith keyframe, and $\mathbb{F}_j$ may be the set of keyframes outside of the sliding window seeing the jth plane $\pi_j$. $J_w$ and $J_f$ may be Jacobian matrices of the residuals $\delta_w$ in $C_w$ and the $\delta_f$ in $C_f$, respectively. Then, the residual $\delta_l$ vector based on equation (17) and the corresponding Jacobian matrix $J_l$ may have the form:

$$\delta_l = \begin{bmatrix} \delta_w \\ \delta_f \end{bmatrix},\ J_l = \begin{bmatrix} J_w \\ J_f \end{bmatrix} \quad (18)$$

Figure 7:
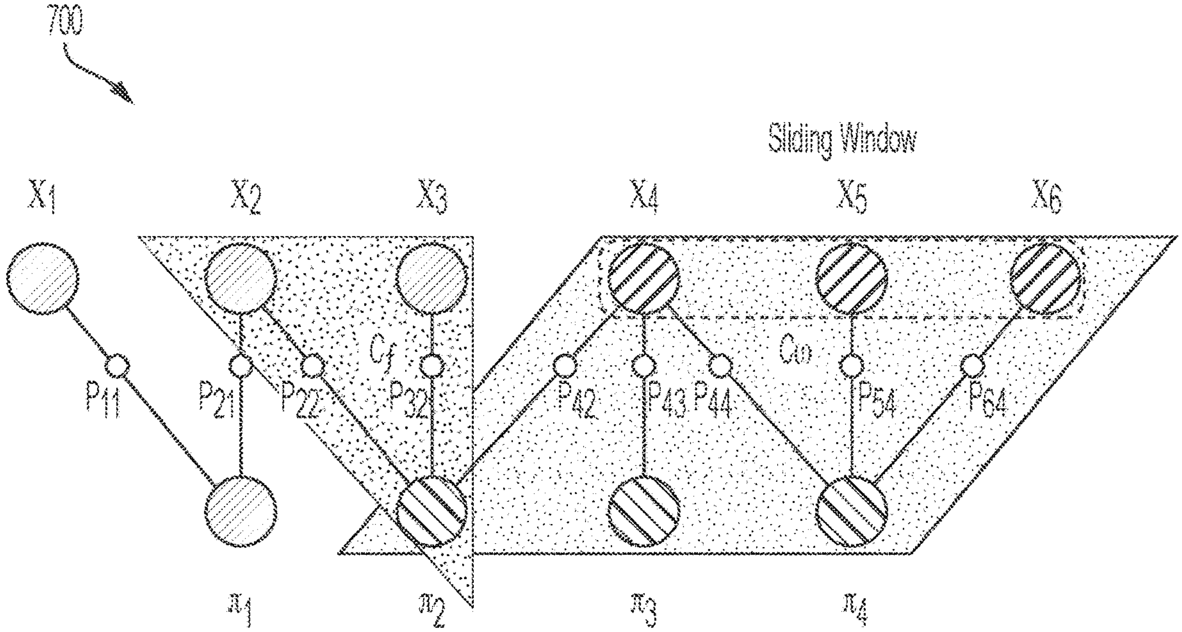
FIG. 7 illustrates an exemplary factor graph, according to embodiments of the disclosure.

FIG. 7 illustrates an exemplary factor graph, according to embodiments of the disclosure. For example, the exemplary factor graph 700 is a factor graph associated with observations of an environment for local mapping (e.g., described in above step) with a window size of three. During local mapping, poses (e.g., $x_4$, $x_5$, $x_6$) and planes (e.g., $\pi_4$, $\pi_5$, $\pi_6$) within the sliding window may be optimized, and other poses (e.g., $x_1$, $x_2$, $x_3$) and planes (e.g., $\pi_1$) may be fixed. $\tilde{\mathbb{P}}^{i,j}$ may be a set of points of plane $\pi_j$ recorded at keyframe $x_i$. A cost function may include two parts, $C_f$ and $C_w$, described with respect to equation (17).

Returning to example method 500, a LM algorithm may be used to compute a step vector by solving a system of linear equations —

$$(J_l^T J_l + \lambda I)\xi = -J_l^T \delta_l.$$

Directly computing $\delta_l$ and $J_l$ may be time-consuming. $\delta_w$ and $J_w$ may be simplified, and $\delta_f$ and $J_f$ may be calculated as follows.

For $\delta_f$ in $C_f$ and for plane $\pi_j$ at pose $T_m$, $\delta_{mjk}(\eta_j)$ from equation (17) may be rewritten as:

$$\delta_{mjk}(\eta_j) = \pi_j^T T_m \overline{p}_{mjk} = \overline{p}_{mjk}^T T_m^T \pi_j \quad (19)$$

The poses of keyframes out of the sliding window may be fixed. By stacking the $K_{mj}$ residuals $\delta_{mjk}(\eta_j)$ in equation (19), the following residual vector may be obtained:

$$\delta_{mj}(\eta_j) = Q_{mj} T_m^T \pi_j = P_{mj} \pi_j \quad (20)$$

$$\text{Where } Q_{mj} T_m^T = P_{mj} \text{ and } Q_{mj} = [\ldots, \overline{p}_{mjk}^T, \ldots]^T.$$

By stacking all the $P_{mj}(m\in\mathbb{F}_j)$, the constraints for $\pi_j$ outside of the sliding window may be obtained:

$$\delta_j(\eta_j) = [\ldots, P_{mj}^T, \ldots]^T \pi_j = P_j \pi_j \tag{21}$$

$$\text{Where } P_j = [\ldots, P_{mj}^T, \ldots]^T$$

Therefore, the residue vector $\delta_f(\eta_j)$ in $C_f$ may be obtained by stacking all $\delta_j(\eta_j)(j \in \mathbb{O})$ and may have a form:

$$\delta_f = [\ldots, \delta_j(\eta_j)^T, \ldots]^T \tag{22}$$

To calculate $J_f$, the derivative of $\delta_{mjk}(\eta)$ may first be calculated. $\eta_j$ may be defined as $\eta_j = [\eta_{j1}, \eta_{j2}, \eta_{j3}]^T$. Then the derivative of $\delta_{mjk}(\eta)$ with respect to $\eta_j$ may have the form:

$$\frac{\partial \delta_{mjk}}{\partial \eta_j} = \left[\frac{\partial \delta_{mjk}}{\partial \eta_{j1}}, \frac{\partial \delta_{mjk}}{\partial \eta_{j2}}, \frac{\partial \delta_{mjk}}{\partial \eta_{j3}}\right] = \overline{q}_{mjk}^T \left[\frac{\partial \pi_j}{\partial \eta_{j1}}, \frac{\partial \pi_j}{\partial \eta_{j2}}, \frac{\partial \pi_j}{\partial \eta_{j3}}\right] = \overline{q}_{mjk}^T V_j \tag{23}$$

$$\text{Where } V_j = \left[\frac{\partial \pi_j}{\partial \eta_{j1}}, \frac{\partial \pi_j}{\partial \eta_{j2}}, \frac{\partial \pi_j}{\partial \eta_{j3}}\right].$$

Using equation (21), the Jacobian matrix for $\delta_j(\eta_j)$ may be written as:

$$J_j = [0 \ldots, P_j V_j, \ldots 0] \tag{24}$$

$J_j(j \in \mathbb{O})$ may be stacked to obtain the Jacobian matrix $J_f$ of the residuals in equation (22):

$$J_f = [\ldots, 1_j^T, \ldots]^T \tag{25}$$

In some embodiments, due to the number of points recorded during a scan (e.g., a LiDAR scan, a scan of a sensor configured to capture a plurality of points), computing $\delta_f$ in equation (22) and $J_f$ in equation (25) may be time-consuming. An integral point-to-plane cost may significantly reduce this computation time.

Using equation (21), the last two summations of $C_f$ from equation (17) may be computed:

$$C_j = \sum_{m \in \mathbb{F}_j} \sum_{k=1}^{K_{mj}} \delta_{mjk}^2 = \delta_j(\eta_j)^T \delta_j(\eta_j) = \pi_j^T P_j^T P_j \pi_j = \pi_j^T H_j \pi_j = \pi_j^T L_j L_j^T \pi_j \tag{26}$$

$$\text{Where } H_j = P_j^T P_j = L_j L_j^T.$$

$$L_j L_j^T$$

may be the Cholesky decomposition of the 4×4 matrix $H_j$. $L_j$ may be a 4×4 lower triangular matrix. Because $H_j$ is a 4×4 matrix, runtime for the Cholesky decomposition may not be significant, advantageously reducing computing time associated with point-to-plane cost calculations. $C_j$ may be called the integral point-to-plane cost for plane $\pi_j$, and $H_j$ may be called the integral cost matrix. $L_j$ may provide information required for performing the LM algorithm. The following may be defined:

$$J_f^r = \begin{bmatrix} \cdot \\ \cdot \\ \cdot \\ J_j^r \\ \cdot \\ \cdot \\ \cdot \end{bmatrix}, \quad \delta_f^r = \begin{bmatrix} \cdot \\ \cdot \\ \cdot \\ \delta_j^r \\ \cdot \\ \cdot \\ \cdot \end{bmatrix} \tag{27}$$

$$\text{Where } J_j^r = [0 \ldots L_J^T V_j \ldots 0] \text{ and } \delta_f^r = L_j^T \pi_j \cdot J_f^r$$

$$\delta_f^r$$

may include information required for performing the LM algorithm, advantageously reducing computing time associated with point-to-plane cost calculations. The following lemmas may be presented:

$$J_f^T J_f = J_f^{r\,T} J_f^r \qquad \text{Lemma 1}$$

Proof: In some embodiments, $J_f$ defined in equation (25) and $$J_f^r$$

defined in equation (27) are block vectors. Using the block matrix multiplication rule, the following may be obtained:

$$J_f^T J_f = \sum_{j \in \mathbb{O}} J_j^T J_j, \; J_f^{r\,T} J_f^r = \sum_{j \in \mathbb{O}} J_j^{r\,T} J_j^r \tag{28}$$

According to the definition of $J_j$ in equation (24), $$J_j^T J_j$$

has one non-zero term $$V_j^T P_j^T P_j V_j,$$

and according to the definition of $H_j$ defined in equation (26):

$$V_j^T P_j^T P_j V_j = V_j^T H_j V_j \tag{29}$$

Similarly, according to the definition of $$J_j^r$$

in equation (27), $$J_j^{r^T} J_j^r$$

has one non-zero term $$V_j^T L_j L_j^T V_j,$$

and based on equation (26)

$$H_j = L_j L_j^T:$$

$$V_j^T L_j L_j^T V_j = V_j^T H_j V_j \quad (30)$$

Therefore, according to equations (29) and (30), $$J_j^T J_j = J_j^{r^T} J_j^r.$$

Thus, based on equation (28), $$J_f^T J_f = J_f^{r^T} J_f^r.$$

$$\text{Lemma 2:} J_f^T \delta_f = J_f^{r^T} \delta_f^r$$

Proof: From equations (25), (22), and (27), $$J_f, J_f^r, \delta_f, \text{ and } \delta_f^r$$

are block vectors with elements), $$J_j, J_j^r, \delta_j, \text{ and } \delta_j^r.$$

Using the block matrix multiplication rule, the following may be obtained:

$$J_f^T \delta_f = \sum_{j \in O} J_j^T \delta_j, J_f^{r^T} \delta_f^r = \sum_{j \in O} J_j^{r^T} \delta_j^r \quad (31)$$

According to the definition of $J_j$ in equation (24) and the definition of $\delta_j$ in equation (21), $$J_j^T \pi_j$$

has one non-zero term $$V_j^T P_j^T P_j \pi_j,$$

and according to the definition of $H_j$ defined in equation (26):

$$V_j^T P_j^T P_j \pi_j = V_j^T H_j \pi_j \quad (32)$$

Similarly, according to the definition of $$J_j^r \text{ and } \delta_j^r$$

in equation (27), $$J_j^{r^T} \delta_j^r$$

has one non-zero term $$V_j^T L_j L_j^T \pi_j,$$

and based on equation (26)

$$H_j = L_j L_j^T:$$

$$V_j^T L_j L_j^T \pi_j = V_j^T H_j \pi_j \quad (33)$$

Therefore, according to equations (32) and (33), $$J_j^T \delta_j = J_j^{r^T} \delta_j^r.$$

Thus, according to equations (31), $$J_f^T \delta_f = J_f^{r^T} \delta_f^r.$$

Lemma 3: In some examples, there are $K_j$ constraints in $\delta_j(\eta_j)$, as defined in equation (21). The run time for computing $$J_j^r, \delta_j^r, J_j^{r^T} J_j^r, \text{ and } J_j^{r^T} \delta_j^r$$

may advantageously be $$\frac{4}{K_j},$$

relative to the terms associated with the original computation, $$J_j,\ \delta_j,\ J_j^T J_j, \text{ and } J_j^T \delta_j,$$

respectively.

Proof: By comparing $$J_j^r \text{ and } \delta_j^r$$

in equation (27) with $J_j$ in equation (24) and $\delta_j$ in equation (21), a difference between the two pairs may be the use of $L_j$ to replace $P_j$. $L_j$ has four rows and $P_{ij}$ has $K_j$ rows. Therefore, a runtime for calculating $$J_j^r \text{ and } \delta_j^r$$

is $$\frac{4}{K_j}$$

relative to calculating $J_j$ and $\delta_j$ and is advantageously reduced. Additionally, according to rules of matrix multiplication, a runtime for calculating $$J_{ij}^{r^T} J_{ij}^r \text{ and } J_{ij}^{r^T} \delta_{ij}^r$$

is $$\frac{4}{K_{ij}}$$

relative to calculating $$J_{ij}^T J_{ij}, \text{ and } J_{ij}^T \delta_{ij},$$

respectively, and is advantageously reduced.

As discussed above, the integral cost matrix, $H_j$, from equation (26), may be critical to simplify computation associated with a cost function. In some embodiments, $H_j$ summarizes the cost derived from observations of plane $\pi_j$ at keyframes outside the sliding window. If there is a large amount of observations, it may be time-consuming for $H_j$ to be computed from the beginning each time. Therefore, in some embodiments, $H_j$ may be incrementally computed to avoid redundant computation and reduce computation time for computing the integral cost matrix $H_j$.

For instance, there may be K keyframes outside of the sliding window that have seen plane $\pi_j$, resulting in a corresponding $$H_j^K$$

computed based on equation (26). $\delta_{nj}(\eta_{nj})=P_{nj}\pi_j$, as defined in equation (21), may be a residual vector derived from observations of $\pi_j$ at the nth keyframe, which is about to move out of the sliding window.

Using the definition of $H_j$ in equation (26) and the definition of $P_j$ in equation (21), $$H_j^{K+1}$$

for the K+1 observation may be obtained:

$$H_j^{K+1} = P_j^T P_j = \sum_{m\in F_j} P_{mj}^T P_{mj} = \sum_{\substack{m\in F_j \\ m\neq n}} P_{mj}^T P_{mj} + P_{nj}^T P_{nj} = H_j^K + P_{nj}^T P_{nj} \tag{34}$$

From equation (34), an integral cost matrix $H_j$ is maintained for each global plane, and $$H_j^{K+1}$$

is updated by $$H_j^{K+1} = H_j^K + P_{nj}^T P_{nj}.$$

In some embodiments, when a keyframe is moved out of a sliding window, the integral matrices of planes observed by this keyframe are updated using equation (34).

Figure 8:
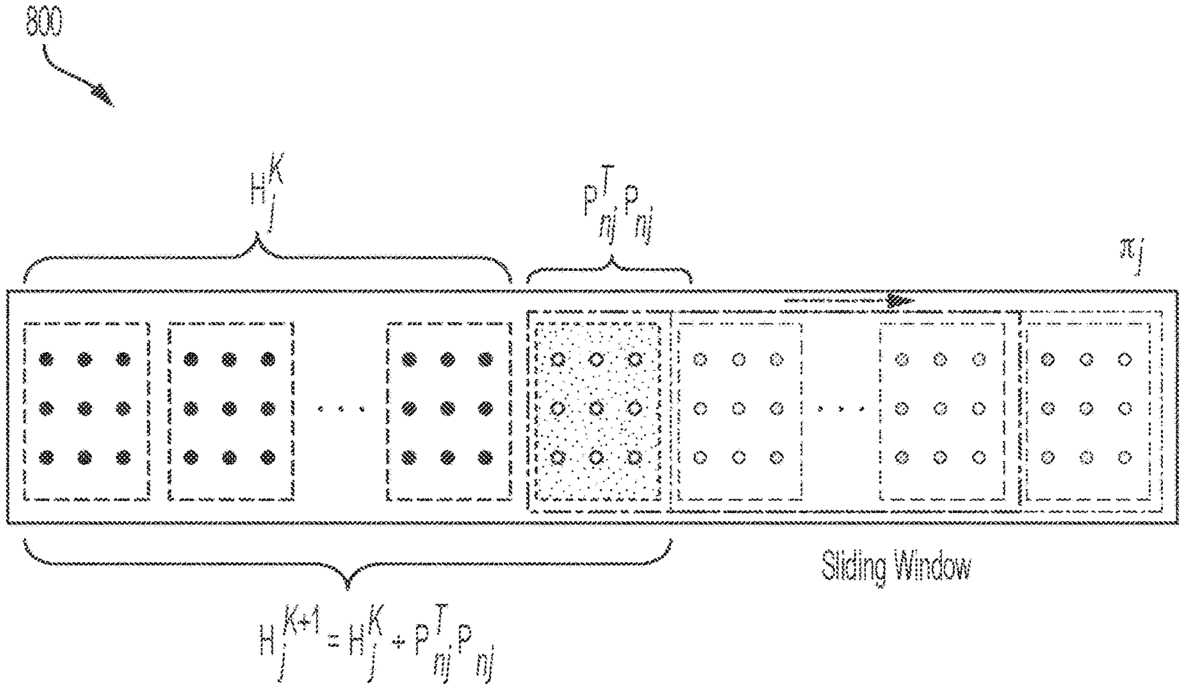
FIG. 8 illustrates an exemplary schematic of updating an integral cost matrix, according to embodiments of the disclosure.

FIG. 8 illustrates an exemplary schematic 800 of updating an integral cost matrix, according to embodiments of the disclosure. For example, schematic 800 illustrates how the integral cost matrix $H_j$ is updated incrementally. For example, the nth keyframe is about to move out of the sliding window, and there are K sets of observations of $\pi_j$ outside of the sliding window. $P_{nj}$ may be obtained from observation (e.g., as indicated by the shade) of $\pi_j$ at the nth keyframe in the form defined by equation (20).

$$H_j^{K+1} \text{ is updated by } H_j^{K+1} = H_j^K + P_{nj}^T P_{nj}.$$

Returning to example method 500 and specifically to equation (17), it may be desirable to minimize equation (17) because in some embodiments, equation (17) is a large-scale optimization problem. The residual vector $\delta_l$ and corresponding Jacobian matrix, $J_l$ from equation (18) may be simplified. $J_w$ and $\delta_w$ in equation (18) may be replaced by a reduced Jacobian $$J_w^r$$

and a reduced residual vector $$\delta_w^r$$

obtained using the LM algorithm. More specifically, $$J_w^T J_w = J_w^{r\,T} J_w^r \text{ and } J_w^T \delta_w = J_w^{r\,T} \delta_w^r,$$

and the following may be defined:

$$\delta_l^r = \begin{bmatrix} \delta_w \\ \delta_f \end{bmatrix}, J_l^r = \begin{bmatrix} J_w \\ J_f \end{bmatrix} \quad (35)$$

Based on this, the following theorem may be derived.

$$\text{Theorem: } J_l^T J_l = J_l^{r\,T} J_l^r \text{ and } J_l^T \delta_l = J_l^{r\,T} \delta_l^r$$

Proof: Based on the definition of $J_l$ and $\delta_l$ from equation (18) and the definition of $$J_l^r \text{ and } \delta_l^r$$

from equation (35), the following relationships may be obtained:

$$J_l^T J_l = J_w^T J_w + J_f^T J_f,\ J_l^{r\,T} J_l^r = J_w^{r\,T} J_w^r + J_f^{r\,T} J_f^r, \quad (36)$$

$$J_l^T \delta_l = J_w^T \delta_w + J_f^T \delta_f,\ J_l^{r\,T} \delta_l^r = J_w^{r\,T} \delta_w^r + J_f^{r\,T} \delta_f^r$$

As discussed, $J_w^T J_w = J_w^{r\,T} J_w^r$ and $J_f^T J_f = J_f^{r\,T} J_f^r$, and thus, $J_l^T J_l = J_l^{r\,T} J_l^r$. Similarly, $J_w^T \delta_w = J_w^{r\,T} \delta_w^r$ and $J_f^T \delta_f = J_f^{r\,T} \delta_f^r$, and thus, $J_l^T \delta_l = J_l^{r\,T} \delta_l^r$.

According to the above theorem, $$J_l^r \text{ and } \delta_l^r$$

may be used to replace $J_l$ and $\delta_l$ in the LM algorithm. In some embodiments, $$J_l^r \text{ and } \delta_l^r$$

have lower dimensions than $J_l$ and $\delta_l$; therefore, computation time may be advantageously reduced by deriving and using $$J_l^r \text{ and } \delta_l^r.$$

In some embodiments, when a loop is determined to be closed, global PBA is performed. For example, in accordance with a determination that a previous plane has been revisited, a loop is determined to be closed, and in accordance with the determination that the loop is closed, global PBA is performed. In some embodiments, global PBA may jointly optimize LiDAR (or similar sensor) poses and plane parameters by minimizing point-to-plane distances.

In some embodiments, the method 500 includes performing global mapping (step 508). During global mapping, keyframe poses and/or plane parameters may be globally optimized (e.g., without a window, compared to local mapping). Performing global mapping may include performing global PBA and/or updating a map.

For example, there are M planes and N keyframes, a transformation matrix for the ith pose may be $T_i$, and the jth plane includes parameters $\pi_j$. Measurements of the jth plane at the ith pose may be a set of $K_{ij}$ points defined as:

$$\mathbb{P}_{ij} = \{p_{ijk}\}_{k=1}^{K_{ij}} \quad (37)$$

Each $p_{ijk} \in \mathbb{P}_{ij}$ may provide one constraint on the ith pose and jth plane. Based on equation (3), the residual $\delta_{ijk}$ for $p_{ijk} \leftrightarrows \pi_j$ may be expressed as:

$$\delta_{ijk}(x_i, \eta_j) = \pi_j^T T_i \bar{p}_{ijk} \quad (38)$$

$x_i$ and $\eta_j$ may represent parameterizations of Ti and $\pi_j$, respectively. $\delta_{ijk}$ may be a function of $x_i$ and $\eta_j$. The PBA process may jointly refine $x_i$ ($i \neq 1$) and $\eta_j$ by minimizing the following least-squares problem (which may be efficiently solved):

$$\min_{\substack{x_i, \eta_j \\ i \neq 1}} \sum_{i=1}^{N} \sum_{j=1}^{M} \sum_{k=1}^{K_{ij}} \delta_{ijk}^2(x_i, \eta_j) \quad (39)$$

An original Jacobian matrix and an original residual vector of equation (39) may be $J_g$ and $r_g$, respectively. Similar to the methods described herein (e.g., with respect to local PBA), a reduced Jacobian matrix $$J_g^r$$

and a reduced residual vector $$r_g^r$$

may be used to replace $J_g$ and $r_g$ in the LM algorithm, reducing computation time.

After the poses are refined, the integral cost matrix $H_j$ may need to be updated. As discussed earlier, the update may be performed efficiently. According to equation (34), $$P_{nj}^T P_{nj}$$

may be critical in computing $H_j$. Based on equation (20), $P_{nj}$ may be expressed as:

$$P_{nj}^T P_{nj} = T_n Q_{nj}^T Q_{nj} T_n^T \quad (40)$$

In some embodiments, $$Q_{nj}^T Q_{nj}$$

is a fixed quantity and may only need to be computed once. From equation (40), after PBA is performed, the refined pose $T_n$ may be used to update $$P_{nj}^T P_{nj},$$

and then, $H_j$ may be updated. Because $$Q_{nj}^T Q_{nj}$$

may be a large fixed quantity and may only need to be computed once, only $$P_{nj}^T P_{nj}$$

may need to be updated, and computing time for $H_j$ may be advantageously reduced.

Figure 9:
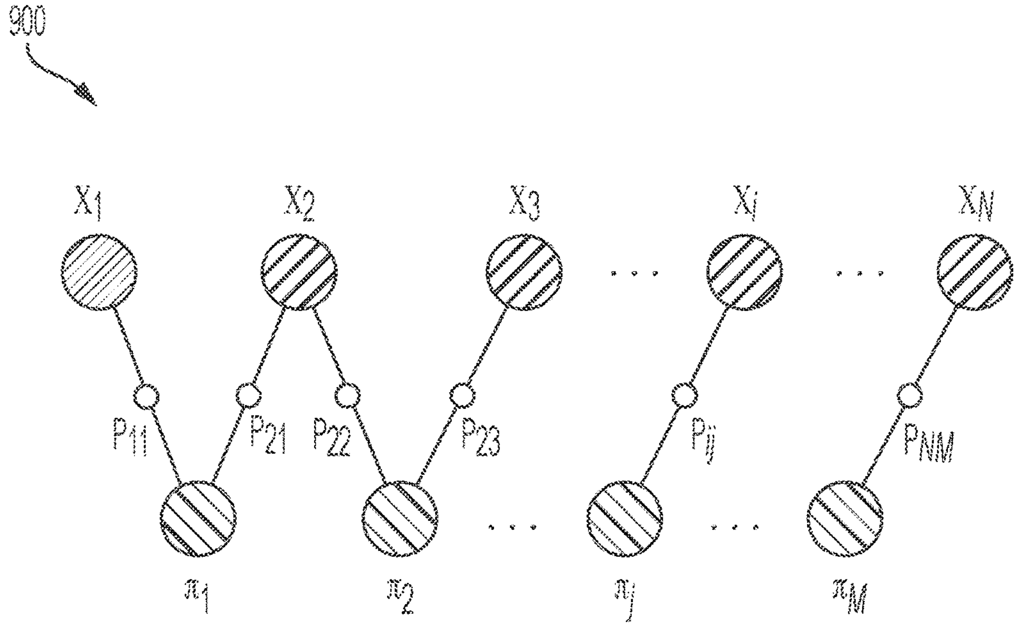
FIG. 9 illustrates an exemplary factor graph, according to embodiments of the disclosure.

FIG. 9 illustrates an exemplary factor graph 900, according to embodiments of the disclosure. For example, the factor graph 900 is associated with observations of an environment and a PBA with N poses and M planes. $x_i$ may represent the ith keyframe, $\pi_j$ may represent the jth global plane, and $\mathbb{P}_{ij}$ may be a set of observations for $\pi_j$ captured at $x_i$. In this example, $x_1$ is fixed during this optimization, and the illustrated PBA problem includes jointly optimizing keyframe poses $$\{x_i\}_{i=2}^N$$

and plane parameters $$\{\pi_j\}_{j=1}^M.$$

According to some embodiments, a method comprises: scanning an environment, wherein said scanning comprises detecting, with a sensor, a plurality of points of the environment; identifying a first plane of the environment, wherein the first plane comprises at least a threshold number of points of the plurality of detected points; obtaining a plurality of observations associated with the environment, the plurality of observations comprising a first subset of observations and a second subset of observations; determining whether the first plane is coplanar with a second plane of the environment; in accordance with a determination that the first plane is coplanar with the second plane, performing a planar bundle adjustment based on the first subset of observations and based further on the second subset of observations; and in accordance with a determination that the first plane is not coplanar with the second plane, performing planar bundle adjustment based on the first subset of observations and not based on the second subset of observations.

According to some embodiments, the sensor comprises a LiDAR sensor.

According to some embodiments, a normal of the first plane comprises a vector in a direction towards an observation center associated with the sensor.

According to some embodiments, performing planar bundle adjustment on the first subset of observations further comprises calculating a cost function associated with keyframe poses in a sliding window associated with the first subset.

According to some embodiments, the method further comprises: determining a distance between a portion of the scanned environment and a first keyframe; in accordance with a determination that the distance between the portion of the scanned environment and the last keyframe is greater than a threshold distance, inserting a second keyframe; and in accordance with a determination that the distance between the portion of the scanned environment and the last keyframe is not greater than the threshold distance, forgoing inserting a second keyframe.

According to some embodiments, the method further comprises: determining a percentage of points being tracked, wherein the first plane includes the points being tracked; in accordance with a determination that the percentage of points being tracked is less than a threshold percentage, inserting a keyframe; and in accordance with a determination that the percentage of points being tracked is not less than the threshold percentage, forgoing inserting the keyframe.

According to some embodiments, the method further comprises determining an integral cost matrix, wherein performing planar bundle adjustment comprises computing a cost function using the integral cost matrix.

According to some embodiments, the method further comprises updating the integral cost matrix based on a previous integral cost matrix.

According to some embodiments, the method further comprises estimating a keyframe pose.

According to some embodiments, the method further comprises linearly interpolating points of a keyframe pose.

According to some embodiments, the method further comprises updating a map of the environment based on the planar bundle adjustment.

According to some embodiments, the environment comprises a mixed reality environment.

According to some embodiments, the sensor comprises a sensor of a mixed reality device.

According to some embodiments, the method further comprises performing the Levenberg-Marquardt method to solve a least-squares function.

According to some embodiments, the method further comprises: in accordance with a determination that the first plane is not coplanar with the second plane, inserting the first plane into a map associated with the environment; and in accordance with a determination that the first plane is coplanar with the second plane, forgoing inserting the first plane into the map associated with the environment.

According to some embodiments, determining whether the first plane is coplanar with the second plane further comprises determining whether a threshold percentage of point-to-plane distances is less than a threshold distance.

According to some embodiments, determining whether the first plane is coplanar with the second plane further comprises performing geometric consistency check.

According to some embodiments, the method further comprises storing in a memory the plurality of observations associated with the environment.

According to some embodiments, the method further comprises transmitting information about the environment, wherein the information about the environment is associated with the plurality of observations associated with the environment.

According to some embodiments, a system comprising: a sensor, and one or more processors configured to cause the system to perform a method comprising: scanning an environment, wherein said scanning comprises detecting, with the sensor, a plurality of points of the environment; identifying a first plane of the environment, wherein the first plane comprises at least a threshold number of points of the plurality of detected points; obtaining a plurality of observations associated with the environment, the plurality of observations comprising a first subset of observations and a second subset of observations; determining whether the first plane is coplanar with a second plane of the environment; in accordance with a determination that the first plane is coplanar with the second plane, performing a planar bundle adjustment based on the first subset of observations and based further on the second subset of observations; and in accordance with a determination that the first plane is not coplanar with the second plane, performing planar bundle adjustment based on the first subset of observations and not based on the second subset of observations.

According to some embodiments, the sensor comprises a LiDAR sensor.

According to some embodiments, a normal of the first plane comprises a vector in a direction towards an observation center associated with the sensor.

According to some embodiments, performing planar bundle adjustment on the first subset of observations further comprises calculating a cost function associated with keyframe poses in a sliding window associated with the first subset.

According to some embodiments, the method further comprises: determining a distance between a portion of the scanned environment and a first keyframe; in accordance with a determination that the distance between the portion of the scanned environment and the last keyframe is greater than a threshold distance, inserting a second keyframe; and in accordance with a determination that the distance between the portion of the scanned environment and the last keyframe is not greater than the threshold distance, forgoing inserting a second keyframe.

According to some embodiments, the method further comprises: determining a percentage of points being tracked, wherein the first plane includes the points being tracked; in accordance with a determination that the percentage of points being tracked is less than a threshold percentage, inserting a keyframe; and in accordance with a determination that the percentage of points being tracked is not less than the threshold percentage, forgoing inserting the keyframe.

According to some embodiments, the method further comprises determining an integral cost matrix, wherein performing planar bundle adjustment comprises computing a cost function using the integral cost matrix.

According to some embodiments, the method further comprises updating the integral cost matrix based on a previous integral cost matrix.

According to some embodiments, the method further comprises estimating a keyframe pose.

According to some embodiments, the method further comprises linearly interpolating points of a keyframe pose.

According to some embodiments, the method further comprises updating a map of the environment based on the planar bundle adjustment.

According to some embodiments, the environment comprises a mixed reality environment.

According to some embodiments, the sensor comprises a sensor of a mixed reality device.

According to some embodiments, the method further comprises performing the Levenberg-Marquardt method to solve a least-squares function.

According to some embodiments, the method further comprises: in accordance with a determination that the first plane is not coplanar with the second plane, inserting the first plane into a map associated with the environment; and in accordance with a determination that the first plane is coplanar with the second plane, forgoing inserting the first plane into the map associated with the environment.

According to some embodiments, determining whether the first plane is coplanar with the second plane further comprises determining whether a threshold percentage of point-to-plane distances is less than a threshold distance.

According to some embodiments, determining whether the first plane is coplanar with the second plane further comprises performing geometric consistency check.

According to some embodiments, the method further comprises storing in a memory the plurality of observations associated with the environment.

According to some embodiments, the method further comprises transmitting information about the environment, wherein the information about the environment is associated with the plurality of observations associated with the environment.

According to some embodiments, a non-transitory computer readable storage medium storing one or more programs, the one or more programs comprising instructions, which when executed by an electronic device with one or more processors and memory, cause the device to perform a method comprising: scanning an environment, wherein said scanning comprises detecting, with a sensor, a plurality of points of the environment; identifying a first plane of the environment, wherein the first plane comprises at least a threshold number of points of the plurality of detected points; obtaining a plurality of observations associated with the environment, the plurality of observations comprising a first subset of observations and a second subset of observations; determining whether the first plane is coplanar with a second plane of the environment; in accordance with a determination that the first plane is coplanar with the second plane, performing a planar bundle adjustment based on the first subset of observations and based further on the second subset of observations; and in accordance with a determination that the first plane is not coplanar with the second plane, performing planar bundle adjustment based on the first subset of observations and not based on the second subset of observations.

According to some embodiments, the sensor comprises a LiDAR sensor.

According to some embodiments, a normal of the first plane comprises a vector in a direction towards an observation center associated with the sensor.

According to some embodiments, performing planar bundle adjustment on the first subset of observations further comprises calculating a cost function associated with keyframe poses in a sliding window associated with the first subset.

According to some embodiments, the method further comprises: determining a distance between a portion of the scanned environment and a first keyframe; in accordance with a determination that the distance between the portion of the scanned environment and the last keyframe is greater than a threshold distance, inserting a second keyframe; and in accordance with a determination that the distance between the portion of the scanned environment and the last keyframe is not greater than the threshold distance, forgoing inserting a second keyframe.

According to some embodiments, the method further comprises: determining a percentage of points being tracked, wherein the first plane includes the points being tracked; in accordance with a determination that the percentage of points being tracked is less than a threshold percentage, inserting a keyframe; and in accordance with a determination that the percentage of points being tracked is not less than the threshold percentage, forgoing inserting the keyframe.

According to some embodiments, the method further comprises determining an integral cost matrix, wherein performing planar bundle adjustment comprises computing a cost function using the integral cost matrix.

According to some embodiments, the method further comprises updating the integral cost matrix based on a previous integral cost matrix.

According to some embodiments, the method further comprises estimating a keyframe pose.

According to some embodiments, the method further comprises linearly interpolating points of a keyframe pose.

According to some embodiments, the method further comprises updating a map of the environment based on the planar bundle adjustment.

According to some embodiments, the environment comprises a mixed reality environment.

According to some embodiments, the sensor comprises a sensor of a mixed reality device.

According to some embodiments, the method further comprises performing the Levenberg-Marquardt method to solve a least-squares function.

According to some embodiments, the method further comprises: in accordance with a determination that the first plane is not coplanar with the second plane, inserting the first plane into a map associated with the environment; and in accordance with a determination that the first plane is coplanar with the second plane, forgoing inserting the first plane into the map associated with the environment.

According to some embodiments, determining whether the first plane is coplanar with the second plane further comprises determining whether a threshold percentage of point-to-plane distances is less than a threshold distance.

According to some embodiments, determining whether the first plane is coplanar with the second plane further comprises performing geometric consistency check.

According to some embodiments, the method further comprises storing in a memory the plurality of observations associated with the environment.

According to some embodiments, the method further comprises transmitting information about the environment, wherein the information about the environment is associated with the plurality of observations associated with the environment.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A method for operating a display system comprising a display, the method comprising:

scanning an environment, wherein said scanning comprises detecting, with a LiDAR sensor, a plurality of points of the environment;

identifying a first plane of the environment, wherein the first plane comprises at least a threshold number of points of the plurality of detected points;

obtaining a plurality of observations associated with the environment, the plurality of observations comprising a first subset of observations and a second subset of observations;

determining whether the first plane is coplanar with a second plane of the environment;

in accordance with a determination that the first plane is coplanar with the second plane, performing a planar bundle adjustment based on the first subset of observations and based further on the second subset of observations;

in accordance with a determination that the first plane is not coplanar with the second plane, performing planar bundle adjustment based on the first subset of observations and not based on the second subset of observations;

generating a representation of the environment based on the planar bundle adjustment; and displaying a virtual object with the display, wherein a displayed location of the virtual object is set based on the representation of the environment.

2. The method of claim 1, wherein a normal of the first plane comprises a vector in a direction towards an observation center associated with the sensor.

3. The method of claim 1, wherein performing planar bundle adjustment on the first subset of observations further comprises calculating a cost function associated with keyframe poses in a sliding window associated with the first subset.

4. The method of claim 1, further comprising:

determining a distance between a portion of the scanned environment and a first keyframe;

in accordance with a determination that the distance between the portion of the scanned environment and the first keyframe is greater than a threshold distance, inserting a second keyframe; and in accordance with a determination that the distance between the portion of the scanned environment and the first keyframe is not greater than the threshold distance, forgoing inserting a second keyframe.

5. The method of claim 1, further comprising:
determining a percentage of points being tracked, wherein the first plane includes the points being tracked;
in accordance with a determination that the percentage of points being tracked is less than a threshold percentage, inserting a keyframe; and
in accordance with a determination that the percentage of points being tracked is not less than the threshold percentage, forgoing inserting the keyframe.

6. The method of claim 1, further comprising determining an integral cost matrix, wherein performing planar bundle adjustment comprises computing a cost function using the integral cost matrix.

7. The method of claim 1, further comprising estimating a keyframe pose.

8. The method of claim 1, further comprising linearly interpolating points of a keyframe pose.

9. The method of claim 1, wherein the environment comprises a mixed reality environment.

10. The method of claim 1, wherein the sensor comprises a sensor of a mixed reality device.

11. The method of claim 1, further comprising:
in accordance with a determination that the first plane is not coplanar with the second plane, inserting the first plane into a map associated with the environment; and
in accordance with a determination that the first plane is coplanar with the second plane, forgoing inserting the first plane into the map associated with the environment.

12. The method of claim 1, wherein determining whether the first plane is coplanar with the second plane further comprises determining whether a threshold percentage of point-to-plane distances is less than a threshold distance.

13. The method of claim 1, wherein determining whether the first plane is coplanar with the second plane further comprises performing a geometric consistency check.

14. The method of claim 1, further comprising storing in a memory the plurality observations associated with the environment.

15. The method of claim 1, further comprising transmitting information about the environment, wherein the information about the environment is associated with the plurality of observations associated with the environment.

16. A display system comprising:
a display;
a LiDAR sensor; and
one or more processors configured to cause the system to perform a method comprising:
scanning an environment, wherein said scanning comprises detecting, with the sensor, a plurality of points of the environment;
identifying a first plane of the environment, wherein the first plane comprises at least a threshold number of points of the plurality of detected points;
obtaining a plurality of observations associated with the environment, the plurality of observations comprising a first subset of observations and a second subset of observations;
determining whether the first plane is coplanar with a second plane of the environment;
in accordance with a determination that the first plane is coplanar with the second plane, performing a planar bundle adjustment based on the first subset of observations and based further on the second subset of observations;
in accordance with a determination that the first plane is not coplanar with the second plane, performing planar bundle adjustment based on the first subset of observations and not based on the second subset of observations;
generating a representation of the environment based on the planar bundle adjustment; and
displaying a virtual object with the display, wherein a displayed location of the virtual object is set based on the representation of the environment.

17. A non-transitory computer readable storage medium storing one or more programs, the one or more programs comprising instructions, which when executed by an electronic device with a display, one or more processors and memory, cause the device to perform a method comprising:
scanning an environment, wherein said scanning comprises detecting, with a LiDAR sensor, a plurality of points of the environment;
identifying a first plane of the environment, wherein the first plane comprises at least a threshold number of points of the plurality of detected points;
obtaining a plurality of observations associated with the environment, the plurality of observations comprising a first subset of observations and a second subset of observations;
determining whether the first plane is coplanar with a second plane of the environment;
in accordance with a determination that the first plane is coplanar with the second plane, performing a planar bundle adjustment based on the first subset of observations and based further on the second subset of observations;
in accordance with a determination that the first plane is not coplanar with the second plane, performing planar bundle adjustment based on the first subset of observations and not based on the second subset of observations;
generating a representation of the environment based on the planar bundle adjustment; and
displaying a virtual object with the display, wherein a displayed location of the virtual object is set based on the representation of the environment.

* * * * *